(12) United States Patent
Zakharchenko et al.

(10) Patent No.: US 11,688,104 B2
(45) Date of Patent: Jun. 27, 2023

(54) MOTION ESTIMATION USING 3D AUXILIARY DATA

(71) Applicant: Huawei Technologies Co., Ltd., Guangdong (CN)

(72) Inventors: Vladyslav Zakharchenko, Sunnyvale, CA (US); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/215,224

(22) Filed: Mar. 29, 2021

(65) Prior Publication Data

US 2021/0217202 A1    Jul. 15, 2021

Related U.S. Application Data

(63) Continuation of application No. PCT/US2019/054194, filed on Oct. 2, 2019.
(Continued)

(51) Int. Cl.
*H04N 19/597* (2014.01)
*H04N 19/56* (2014.01)
(Continued)

(52) U.S. Cl.
CPC ............ *G06T 9/00* (2013.01); *G06T 17/00* (2013.01); *H04N 19/52* (2014.11); *H04N 19/56* (2014.11);
(Continued)

(58) Field of Classification Search
CPC ...... H04N 19/56; H04N 19/597; H04N 19/52; H04N 7/18; G06T 17/00; G06T 9/001;
(Continued)

(56) References Cited

U.S. PATENT DOCUMENTS 11,017,566 B1 * 5/2021 Tourapis ............ H03M 7/3059
2010/0104158 A1   4/2010 Shechtman et al.
(Continued)

FOREIGN PATENT DOCUMENTS

CN    106600710    * 10/2016
CN    108053481 A    5/2018
(Continued)

OTHER PUBLICATIONS

3DG, "PCC Test Model Category 2 v1," International Organisation for Standardisation, ISO/IEC JTC1/SC29/WG11, Coding of Moving Pictures and Audio, N17348, Gwangju, Korea, Jan. 2018, 11 pages.
(Continued)

*Primary Examiner* — Zaihan Jiang
(74) *Attorney, Agent, or Firm* — Fish & Richardson P.C.

(57) ABSTRACT

Methods, systems, and apparatus, including computer programs encoded on computer storage media, for performing motion estimation. In some implementations, a method includes generating a segmentation of point cloud data based on continuity data of the point cloud data. A representation of the segmented point cloud data is projected onto sides of a three-dimensional bounding box. Patches are generated based on the projected representation of the segmented point cloud data. A first frame of the patches is generated. First and second auxiliary information is generated using the first frame and a reference frame. A first patch from the first frame is identified that matches a patch from the reference frame based on the first and second auxiliary information. A motion vector candidate is generated between the first and second patch based on a difference between the first and second auxiliary information. Motion compensation is performed using the motion vector candidate.

20 Claims, 30 Drawing Sheets

Related U.S. Application Data

(60) Provisional application No. 62/863,362, filed on Jun. 19, 2019, provisional application No. 62/740,237, filed on Oct. 2, 2018.

(51) Int. Cl.
*H04N 19/52* (2014.01)
*G06T 9/00* (2006.01)
*G06T 17/00* (2006.01)

(52) U.S. Cl.
CPC ........ *H04N 19/597* (2014.11); *G06T 2210/56* (2013.01)

(58) Field of Classification Search
CPC ... G06T 9/00; G06T 7/11; G06T 2207/10028; G06T 2210/56
See application file for complete search history.

(56) References Cited

U.S. PATENT DOCUMENTS

| | | | |
|---|---|---|---|
| 2015/0009214 A1 | 1/2015 | Lee et al. | |
| 2015/0178988 A1* | 6/2015 | Montserrat Mora | ... G06T 17/20 345/420 |
| 2017/0347120 A1 | 11/2017 | Chou et al. | |
| 2019/0087979 A1* | 3/2019 | Mammou | ............... G06T 9/004 |
| 2019/0311502 A1* | 10/2019 | Mammou | ............... G06T 17/00 |
| 2019/0325089 A1* | 10/2019 | Golparvar-Fard | .... G06T 19/003 |
| 2020/0007867 A1* | 1/2020 | Tourapis | .............. H04N 19/156 |
| 2020/0021847 A1* | 1/2020 | Kim | ...................... H04N 19/597 |
| 2020/0111237 A1* | 4/2020 | Tourapis | ................. G06T 9/001 |
| 2020/0314435 A1* | 10/2020 | Tourapis | ................... G06T 7/74 |
| 2021/0090301 A1* | 3/2021 | Mammou | ................. G06T 7/11 |
| 2021/0097723 A1* | 4/2021 | Kim | .......................... G06T 9/00 |
| 2021/0099701 A1* | 4/2021 | Tourapis | ............. H04N 19/172 |
| 2021/0103776 A1* | 4/2021 | Jiang | ....................... G06T 15/20 |

FOREIGN PATENT DOCUMENTS

| | | | |
|---|---|---|---|
| CN | 108171217 A | | 6/2018 |
| EP | 3633621 | * | 2/2018 |
| EP | 3373583 A1 | | 9/2018 |
| EP | 3633621 | * | 10/2018 |
| GB | 2520338 A | | 5/2015 |
| JP | 2021511712 | * | 11/2014 |
| JP | 2020017946 A | | 1/2020 |
| KR | 20160130414 A | | 11/2016 |
| WO | 2018162406 A1 | | 9/2018 |
| WO | WO-2018162406 | * | 9/2018 |
| WO | WO 2018162406 | * | 9/2018 |
| WO | 2019055963 A1 | | 3/2019 |
| WO | 2019142164 A1 | | 7/2019 |
| WO | 2020003037 A1 | | 1/2020 |

OTHER PUBLICATIONS

3DG Subgroup, "First version of the PCC WD Category 2," International Organisation for Standardisation, ISO/IEC JTC1/SC29/WG11, Coding of Moving Pictures and Audio, N17374, Gwangju, Korea, Jan. 2018, 5 pages.

Extended European Search Report issued in European Application No. 19869618.9 dated Oct. 12, 2021, 13 pages.

Fengguang et al., "Removal Method of Mismatching Keypoints in 3D Point Cloud," Acta Optica Sinica, Issue 02, Feb. 2018, 11 pages (English abstract).

Graziosi, "M43679: TMC2 Luminance Adjustment," Sony Corporation, Slide Presentation, Jul. 15, 2018, 10 pages.

Graziosi, "[PCC] TMC2 Luminance Adjustment," International Organisation for Standardisation, ISO/IEC JTC1/SC29/WG11, Coding of Moving Pictures and Audio, m43679, Ljubljana, Slovenia, Jul. 2018, 8 pages.

Graziosi et al., "PCC Core Experiment on patch packing," International Organisation for Standardization, ISO/IEC JTC1/SC29/WG11, Coding of Moving Pictures and Audio, N17871, Ljubljana, Slovenia, Jul. 2018, 10 pages.

Li et al., "[V-PCC] [New contribution] Motion Vector prediction improvement for point cloud coding," International Organisation for Standardisation, ISO/IEC JTC1/SC29/WG11, Coding of Moving Pictures and Audio, m44941, Macau, CN, Oct. 2018, 4 pages.

MPEG 3DG and Requirements, "Call for Proposals for Point Cloud Compression V2," International Organisation for Standardisation, ISO/IEC JTC1/SC29/WG11, Coding of Moving Pictures and Audio, N16763, Hobart, AU, Apr. 2017, 21 pages.

Office Action issued in Chinese Application No. 201980063719.0 dated Aug. 30, 2021, 11 pages (with English translation).

PCT International Search Report and Written Opinion issued in International Application No. PCT/US2019/054194 dated Dec. 30, 2019, 9 pages.

Zakharchenko et al., "Encoder-only Supplemental Motion Vector Estimation for Point Cloud Coding content," Joint Collaborative Team on Video Coding (JCT-VC) of ITU-T SG 16 WP 3 and ISO/IEC JTC 1/SC 29/WG 11, Document: JCTVC-AJ0028-v2, 36th Meeting, Gothenburg, Sweden, Jul. 6-12, 2019, 4 pages.

Zakharchenko et al., "[V-PCC] Report on Exploration Experiment 2.1 on 3D motion estimation for video compression," International Organisation for Standardisation, ISO/IEC JTC1/SC29/WG11, Coding of Moving Pictures and Audio, m45967, Narrakech, MA, Jan. 2019, 5 pages.

Liu et al., "Three-Dimensional Point-Cloud Plus Patches: Towards Model-Based Image Coding in the Cloud," 2015 IEEE International Conference on Multimedia Big Data, Apr. 2015, 6 pages.

Mekuria et al., "Design, Implementation, and Evaluation of a Point Cloud Codec for Tele-Immersive Video," IEEE Transactions on Circuits and Systems for Video Technology, vol. 27, No. 4, Apr. 2017, 15 pages.

Mekuria et al., "Overview of the MPEG Activity on Point Cloud Compression," 2016 Data Compression Conference (DCC), Mar. 29-Apr. 1, 2016, 1 page.

Office Action issued in Japanese Application No. 2021-518178 dated Jul. 5, 2022, 4 pages (with English translation).

Office Action issued in Korean Application No. 2021-7012942 dated Oct. 18, 2022, 13 pages (with English translation).

Office Action in Korean Appln. No. 10-2021-7012942, dated Apr. 24, 2023, 5 pages (with English translation).

* cited by examiner

3000

| Generate a segmentation of a three-dimensional point cloud data of recorded media based on continuity data of the three-dimensional point cloud data<br>3002 |
|---|

↓

| Project a representation of the segmented three-dimensional point cloud data onto one or more sides of a three-dimensional bounding box, the representation of the segmented three-dimensional point cloud data being different based on a projected side of the three-dimensional bounding box   3004 |
|---|

↓

| Generate one or more patches based on the projected representation of the segmented three-dimensional point cloud data<br>3006 |
|---|

↓

| Generate a first frame of the one or more patches<br>3008 |
|---|

↓

| Generate first auxiliary information for the first frame<br>3010 |
|---|

↓

| Generate second auxiliary information for a reference frame<br>3012 |
|---|

↓

| Identify a first patch from the first frame that matches a second patch from the reference frame based on the first auxiliary information and the second auxiliary information   3014 |
|---|

↓

| Generate a motion vector candidate between the first patch and the second patch based on a difference between the first auxiliary information and the second auxiliary information   3016 |
|---|

↓

| Perform motion compensation using the motion vector candidate<br>3018 |
|---|

FIG. 30

MOTION ESTIMATION USING 3D AUXILIARY DATA

CROSS REFERENCE TO RELATED APPLICATIONS

This application is a continuation of International Application No. PCT/US2019/054194, filed on Oct. 2, 2019, the disclosure of which is incorporated herein by reference as if reproduced in its entirety. The present application also claims priority to U.S. Provisional Patent Application No. 62/740,237 filed on Oct. 2, 2018 and U.S. Provisional Patent Application No. 62/863,362 filed on Jun. 19, 2019, both of which are incorporated herein by reference in their entirety.

BACKGROUND

Point cloud processing has become an integral part of a wide variety of applications in applications such as, entertainment industry, intelligent automobile navigation, geospatial inspection, three dimensional (3-D) modeling of real world objects, and environmental visualizations.

SUMMARY

In some implementations, the specification describes techniques for performing motion estimation using three-dimensional and two-dimensional auxiliary data. Motion estimation is performed for encoding and transmitting three-dimensional point cloud data. The three-dimensional point cloud data includes data points that outline or visually represent an external surface of a three-dimensional object, such as a human or a real-world item. The three-dimensional point cloud data can also include attribute information that indicates color, texture, and depth of the three-dimensional point cloud data. An encoder or decoder can encode or decode, respectively, the three-dimensional point cloud data using motion refinement data.

In some implementations, the encoder or decoder uses a three-dimensional bounding box to surround the three-dimensional point cloud data and subsequently generate patches used for encoding and transmission. The encoder can project images of the three-dimensional point cloud data onto each side of the three-dimensional bounding box. The encoder can group the images or patches into a frame to use for encoding. To reduce the amount of bandwidth typically used for transmitting three-dimensional point cloud data, which is typically large, the encoder can instead generate motion refinement data by comparing a patch from a currently generated frame to patches of a previously generated frame. The encoder can match patches between the two frames and generate motion refinement data based on data identifying the matched patches. For example, the encoder may use auxiliary information that define locational coordinates and size of the patches to include as motion refinement data. Instead of encoding and transmitting the frames of patches, motion refinement data can be used for encoding and transmission to reduce the overall transmission bandwidth and properly decode and receive the message. Once the motion refinement data is identified, the motion refinement data can be added to existing video compression techniques for improved transmission of three-dimensional point cloud data.

In one general aspect, a method includes: generating a segmentation of three-dimensional point cloud data of recorded media based on continuity data of the three-dimensional point cloud data; projecting a representation of the segmented three-dimensional point cloud data onto one or more sides of a three-dimensional bounding box, the representation of the segmented three-dimensional point cloud data being different based on a projected side of the three-dimensional bounding box; generating one or more patches based on the projected representation of the segmented three-dimensional point cloud data; generating a first frame of the one or more patches; generating first auxiliary information for the first frame; generating second auxiliary information for a reference frame; identifying a first patch from the first frame that matches a second patch from the reference frame based on the first auxiliary information and the second auxiliary information; generating a motion vector candidate between the first patch and the second patch based on a difference between the first auxiliary information and the second auxiliary information; and performing motion compensation using the motion vector candidate.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes wherein the reference frame corresponds to a previously encoded frame that was transmitted and is decoded to generate the second auxiliary information.

In some implementations, generating the segmentation of the three-dimensional point cloud data of the recorded media further comprises: generating a plurality of segmentations over the three-dimensional point cloud media for subsequently projecting and encoding each segmentation of the plurality of segmentations.

In some implementations, the first auxiliary information includes index data for each of the one or more patches, two-dimensional data for each of the one or more patches, and three-dimensional data for each of the one or more patches.

In some implementations, the index data for each of the one or more patches corresponds to a corresponding side of the three-dimensional bounding box.

In some implementations, the two-dimensional data for each of the one or more patches and the three-dimensional data for each of the one or more patches correspond to a portion of the three-dimensional point cloud data are connected.

In some implementations, generating the one or more patches for the three-dimensional point cloud data based on the continuity data of the three-dimensional point cloud data further comprises: determining a smoothness criteria of the three-dimensional point cloud data from each direction; comparing the smoothness criteria from each direction of the three-dimensional point cloud data; and in response to comparing, selecting a direction of a smoothness criteria of three-dimensional point cloud data that has a greater projection area onto a side of a bounding box.

In some implementations, generating the motion vector candidate between the first patch and the second patch further includes: determining a distance between two-dimensional data of the first auxiliary information and two dimensional data of the second auxiliary information; generating the motion vector candidate based on the distance between the two-dimensional data of the first auxiliary information and the two dimensional data of the second auxiliary information; and adding the motion vector candidate to a motion vector candidate list.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 18 is an example of a video-based point cloud compression (V-PCC) bitstream structure.

FIG. 30 is a flow diagram that illustrates an example of a process for performing motion estimation using 3D auxiliary data.

Like reference numbers and designations in the various drawings indicate like elements.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
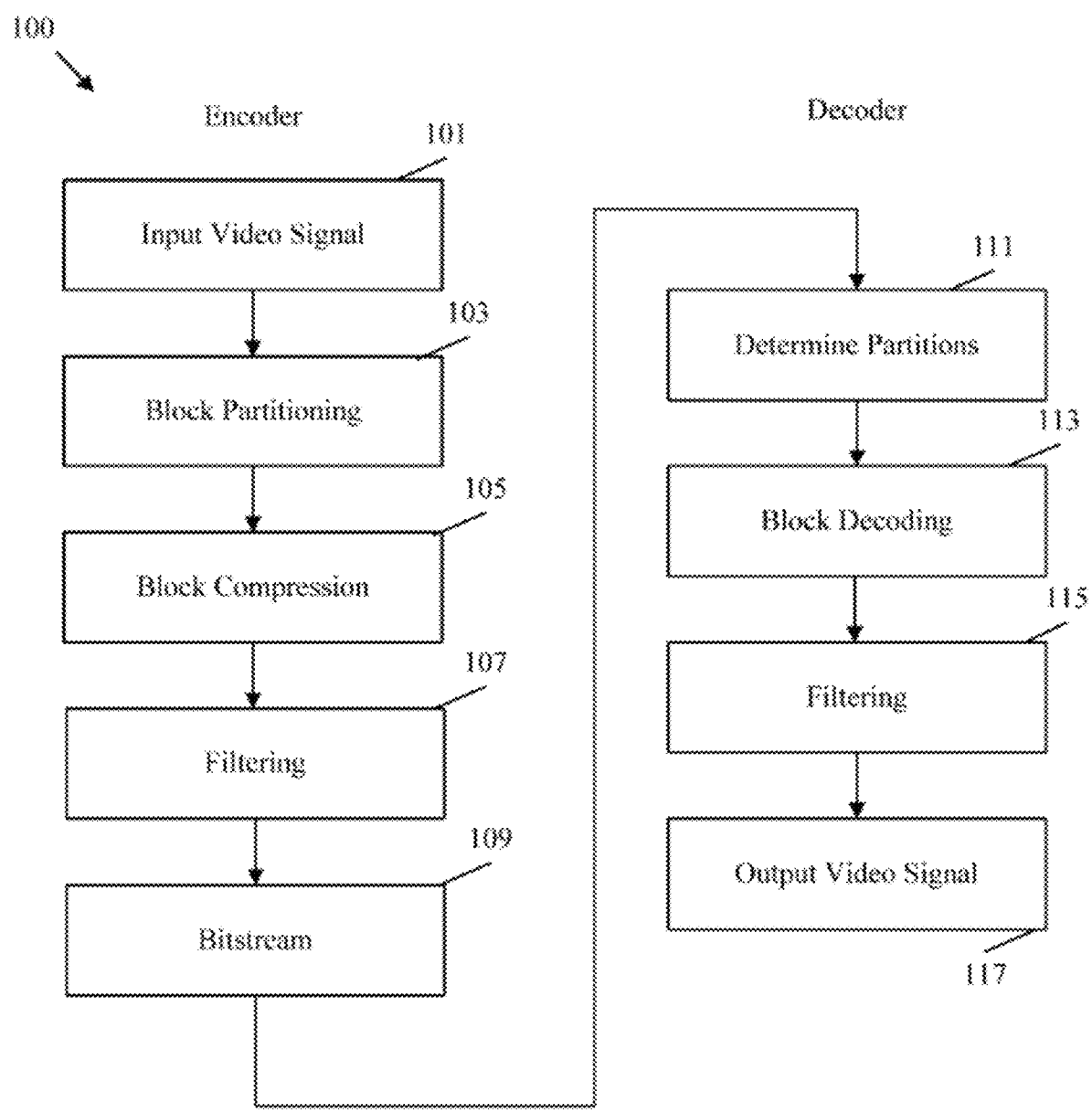
FIG. 1 is a flowchart of an example method of coding a video signal.

FIG. 1 is a flowchart of an example method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components, and color, which is referred to as chroma components. In some examples, the frames may also contain depth values to support three-dimensional viewing.

At step 103, the video is partitioned into blocks. Partitioning includes subdividing the pixels in each frame into square and/or rectangular blocks for compression. For example, coding trees may be employed to divide and then recursively subdivide blocks until configurations are achieved that support further encoding. As such, the blocks may be referred to as coding tree units in High Efficiency Video Coding (HEVC) (also known as H.265 and MPEG-H Part 2). For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in subsequent frames. Specifically, an object, such as a table, may remain in a constant position over multiple frames. Hence, the table need only be described once and subsequent frames can refer back to the reference frame. Pattern matching mechanisms may be employed to match objects over multiple frames. Further, moving objects may be represented across multiple frames, for example due to object movement or camera movement. As a particular example, video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as a neighbor block in a corresponding direction. Planar mode indicates that a series of blocks along a row (e.g., a plane) can be interpolated based on neighbor blocks at the edges of the row. Planar mode, in effect, indicates a smooth transition of light/color across a row by employing a relatively constant slope in changing values. DC mode is employed for boundary smoothing and indicates that a block is similar/the same as an average value associated with all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block-based prediction discussed above may result in the creation of blocky images at the decoder. Further, the block based prediction scheme may encode a block and then reconstruct the encoded block for later use as a reference block. The in-loop filtering scheme iteratively applies noise suppression filters, deblocking filters, adaptive loop filters, and SAO filters to the blocks/frames. These filters mitigate such blocking artefacts so that the encoded file can be accurately reconstructed. Further, these filters mitigate artefacts in the reconstructed reference blocks so that artefacts are less likely to create additional artefacts in subsequent blocks that are encoded based on the reconstructed reference blocks. The in-loop filtering process is discussed in detail below.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block-partitioning schemes from several possible choices based on the spatial positioning of values in the input image(s). Signaling the exact choices may employ a large number of bins. As used herein, a bin is a binary value that is treated as variable (e.g., a bit value that may vary depending on context). Entropy coding allows the encoder to discard any options that are clearly not viable for a particular case, leaving only a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words, as the code words are only as big as desired to uniquely indicate a selection from a small subset of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, deblocking filters, adaptive loop filters, and SAO filters may be applied to the frames to remove blocking artefacts. Once the frames are filtered, the video signal can be output to a display at step 117 for viewing by an end user.

Figure 2:
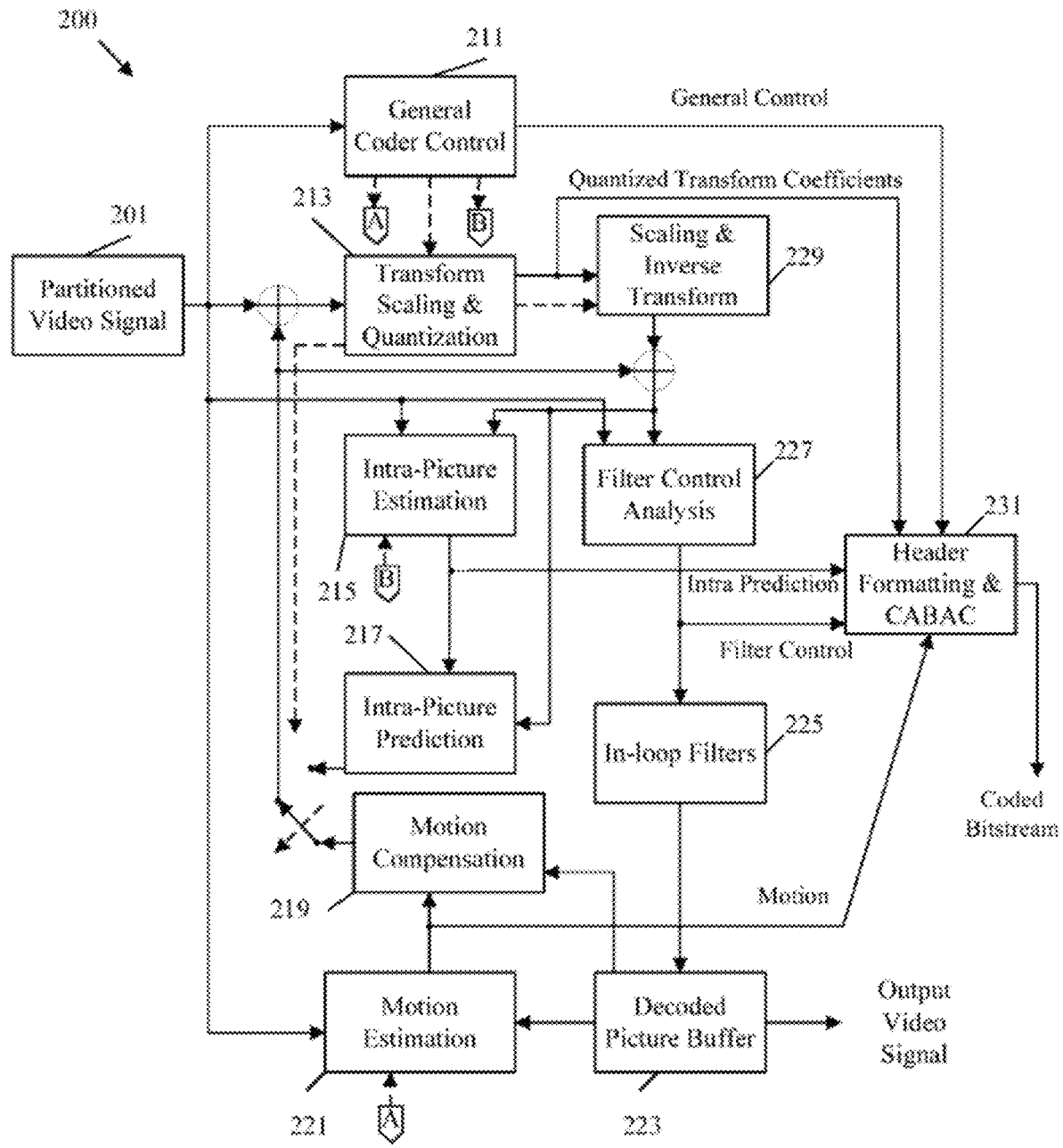
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of method 100. Codec system 200 is generalized to depict components employed in both an encoder and a decoder. Codec system 200 receives and partitions a video signal as discussed with respect to steps 101 and 103 in method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filter component 225, a decoded picture buffer component 223, and a header formatting and Context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra- picture prediction component 217, the motion compensation component 219, the scaling and inverse transform component 229, the in-loop filter component 225, and the decoded picture buffer component 223. These components are now described.

The partitioned video signal 201 is a captured video stream that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks are referred to as coding units (CUs) in some cases. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manages these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder controls component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a prediction unit (PU) of a video block relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, codec system 200 may calculate values for sub-integer pixel positions of reference pictures stored in decoded picture buffer 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points a reference picture list. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original uncoded block that was encoded to produce the encoded block, as well as a bit rate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth-modeling mode (DMM) based on rate-distortion optimization (RDO).

The intra-picture prediction component 217 may generate a residual block from the predictive block based on the selected intra-prediction modes determined by intra-picture estimation component 215. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms, or other types of transforms could also be used. The transform may convert the residual information from a pixel value domain to a transform domain, such as a frequency domain. The transform scaling and quantization component 213 is also configured to scale the transformed residual information, for example based on frequency.

Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artefacts created during scaling, quantization, and transform. Such artefacts could otherwise cause inaccurate prediction (and create additional artefacts) when subsequent blocks are predicted.

The filter control analysis component 227 and the in-loop filters component 225 apply the filters to the residual blocks and/or to reconstructed image blocks. For example, the transformed residual block from scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer 223 for later use in motion estimation as discussed above. When operating as a decoder, the decoded picture buffer 223 stores and forwards the reconstructed and filtered blocks toward a display as part of an output video signal. The decoded picture buffer 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of a most probable intra-prediction modes, an indication of partition information, etc. Such data may be encoded be employing entropy coding. For example, the information may be encoded by employing context adaptive variable length coding (CAVLC), CABAC, and syntax-based context adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
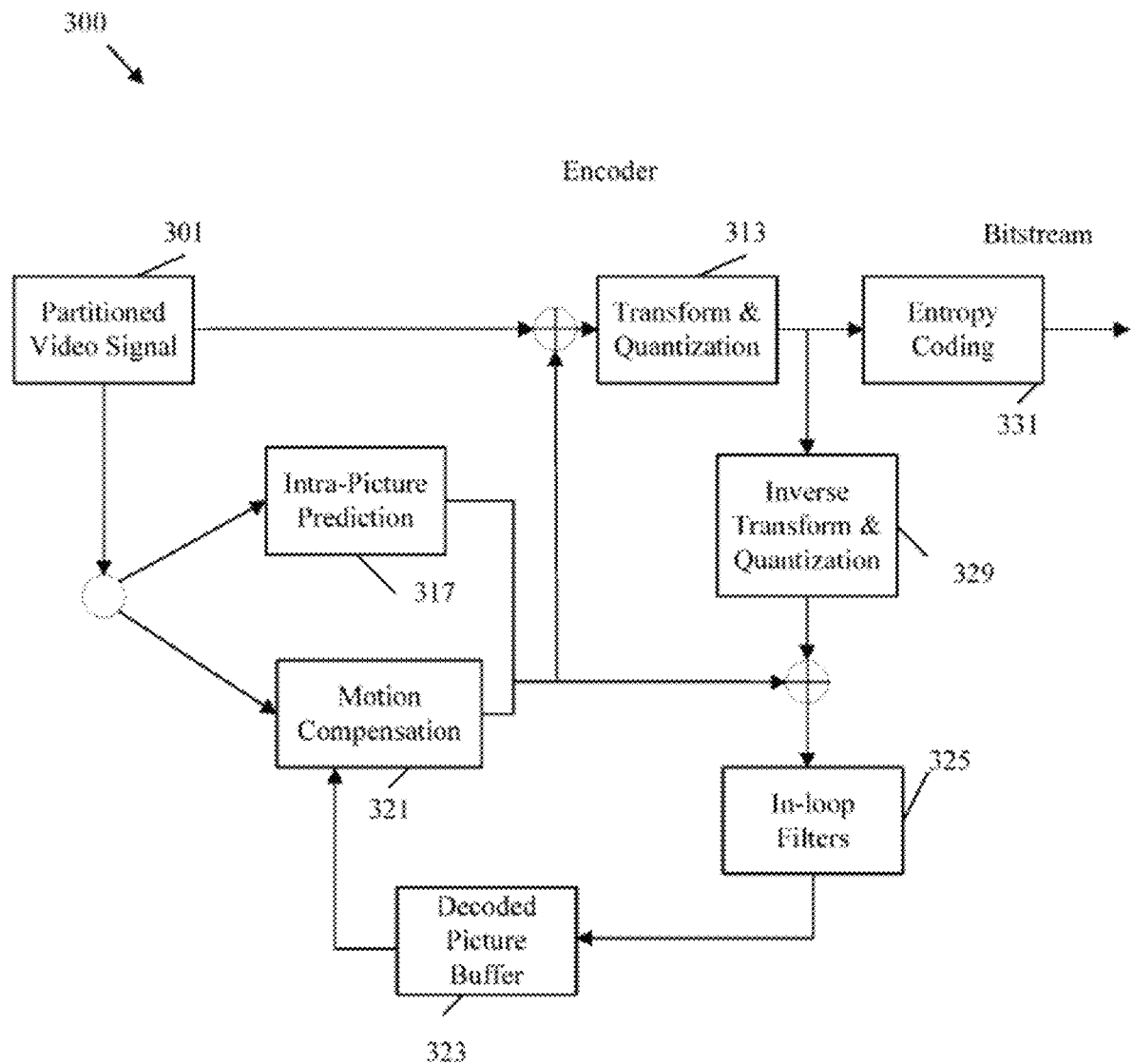
FIG. 3 is a block diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy-coding component 331 for coding into a bitstream. The entropy-coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters, including a noise suppression filter as discussed below. The filtered blocks are then stored in a decoded picture buffer 323 for use a reference blocks by the motion compensation component 321. The decoded picture buffer 323 may be substantially similar to the decoded picture buffer 223.

Figure 4:
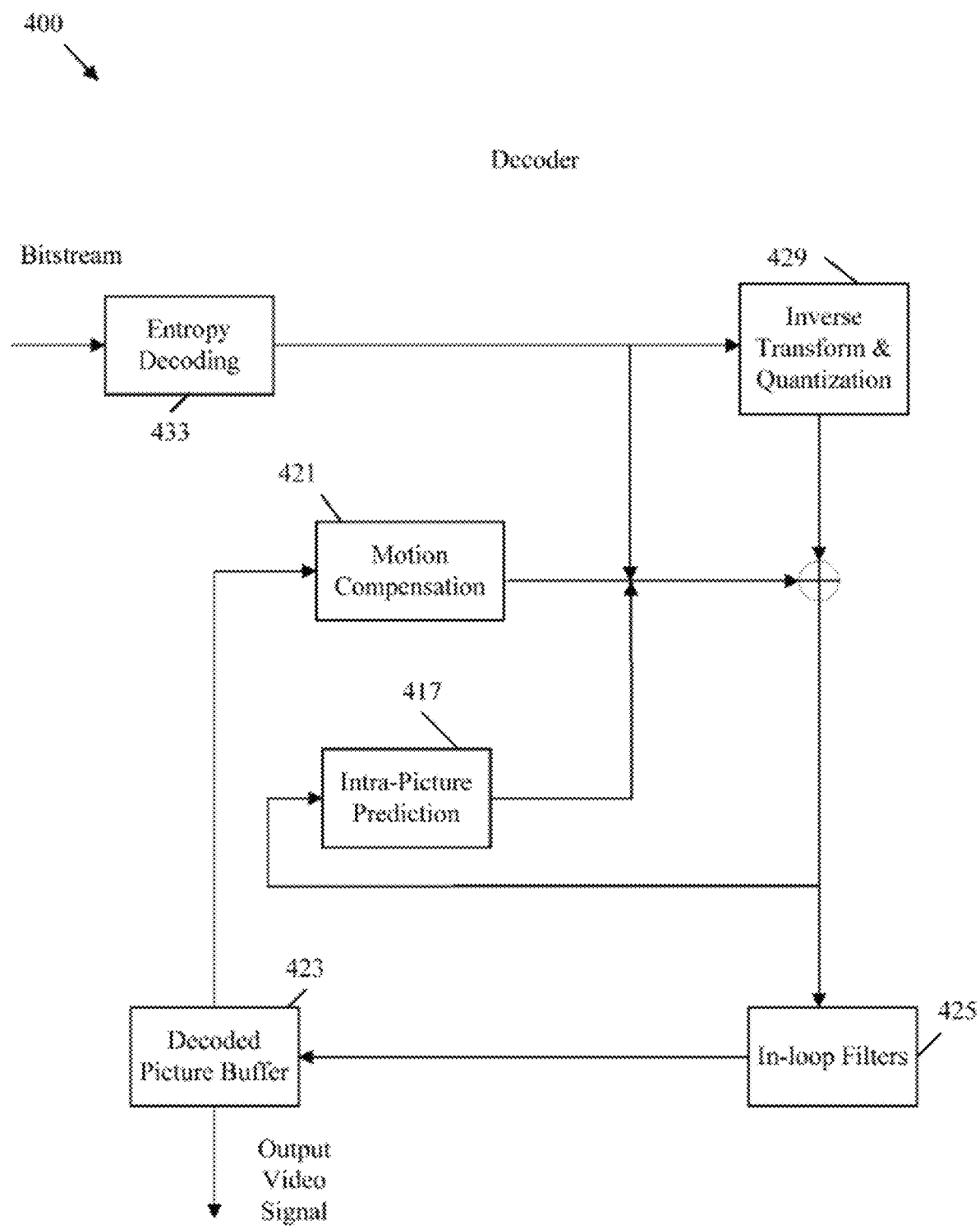
FIG. 4 is a block diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of method 100. Decoder 400 receives a bitstream, for example from an encoder 300, and generates a reconstructed output video signal based on the bitstream for display to an end user.

The bitstream is received by an entropy decoding component 433. The entropy-decoding component 433 performs the reverse function of the entropy-encoding component 331. The entropy-decoding component 433 is configured to implement an entropy-decoding scheme, such as CAVLC, CABAC, SBAC, and PIPE coding or other entropy coding technique. For example, the entropy-decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be substantially similar to the inverse transform and quantization component 329.

The reconstructed residual blocks and/or prediction blocks are forwarded to intra-picture prediction component 417 for reconstruction into image blocks based on intra-prediction operations. Intra-picture prediction component 417 may be substantially similar to intra-picture prediction component 317, but operate in reverse. Specifically, the intra-picture prediction component 417 employs prediction modes to locate a reference block in a frame and applies a residual block to the result to reconstruct intra-predicted image blocks. The reconstructed intra-predicted image blocks and/or the residual blocks and corresponding inter-prediction data are forwarded to a decoded picture buffer component 423 via in-loop filters component 425, which may be substantially similar to decoded picture buffer component 323 and in-loop filters component 325, respectively. The in-loop filters component 425 filter the reconstructed image blocks, residual blocks, and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion compensation component 321, but may operate in reverse. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Inter-prediction.

Many schemes are employed in tandem to compress video data during the video coding process. For example, a video sequence is divided into image frames. The image frames are then partitioned into image blocks. The image blocks may then be compressed by inter-prediction (correlation between blocks in different frames) or intra-prediction (correlation between blocks in the same frame).

Inter-prediction is employed when a coding object, such as a coding tree unit (CTU), a coding tree block (CTB), a coding unit (CU), a sub-CU, etc., appears in multiple frames of a video sequence. Rather than coding the same object in each frame, the object is coded in a reference frame and a motion vector (MV) is employed to indicate a motion trajectory of an object. The motion trajectory of an object is the object's movement over time. An MV is a vector that indicates a direction and magnitude of an objects change in position between frames. The object and the MV can be coded in a bitstream and decoded by a decoder. In an effort to further increase coding efficiency and reduce the size of the encoding, the MV may be omitted from the bitstream and derived at the decoder. For example, a pair of reference frames may be employed. A reference frame is a frame in a bitstream that incudes data that can be coded by reference when coding related frames. Matching algorithms, such as bi-lateral matching and/or template matching may be employed to determine the position of the coding object in both reference frames. A bi-lateral matching algorithm matches a block in a previous frame to a block in a current frame. A template-matching algorithm matches adjacent blocks to a current block with adjacent blocks to the current block in one or more reference frames. Once the position of the object is determined in both reference frames, an MV can be determined that represents the motion of the object between the reference frames. The MV can then be employed to position the object in the frames between the reference frames. As a specific example, an initial MV can be determined for an entire CU. A local search can then be employed to refine the initial MV. Further, MVs for sub-CU components of the object can be determined and refined based on the refined initial MV. Such an approach indicates the correct position of the object so long as the motion trajectory of the object is continuous between the reference frames.

Figure 5:
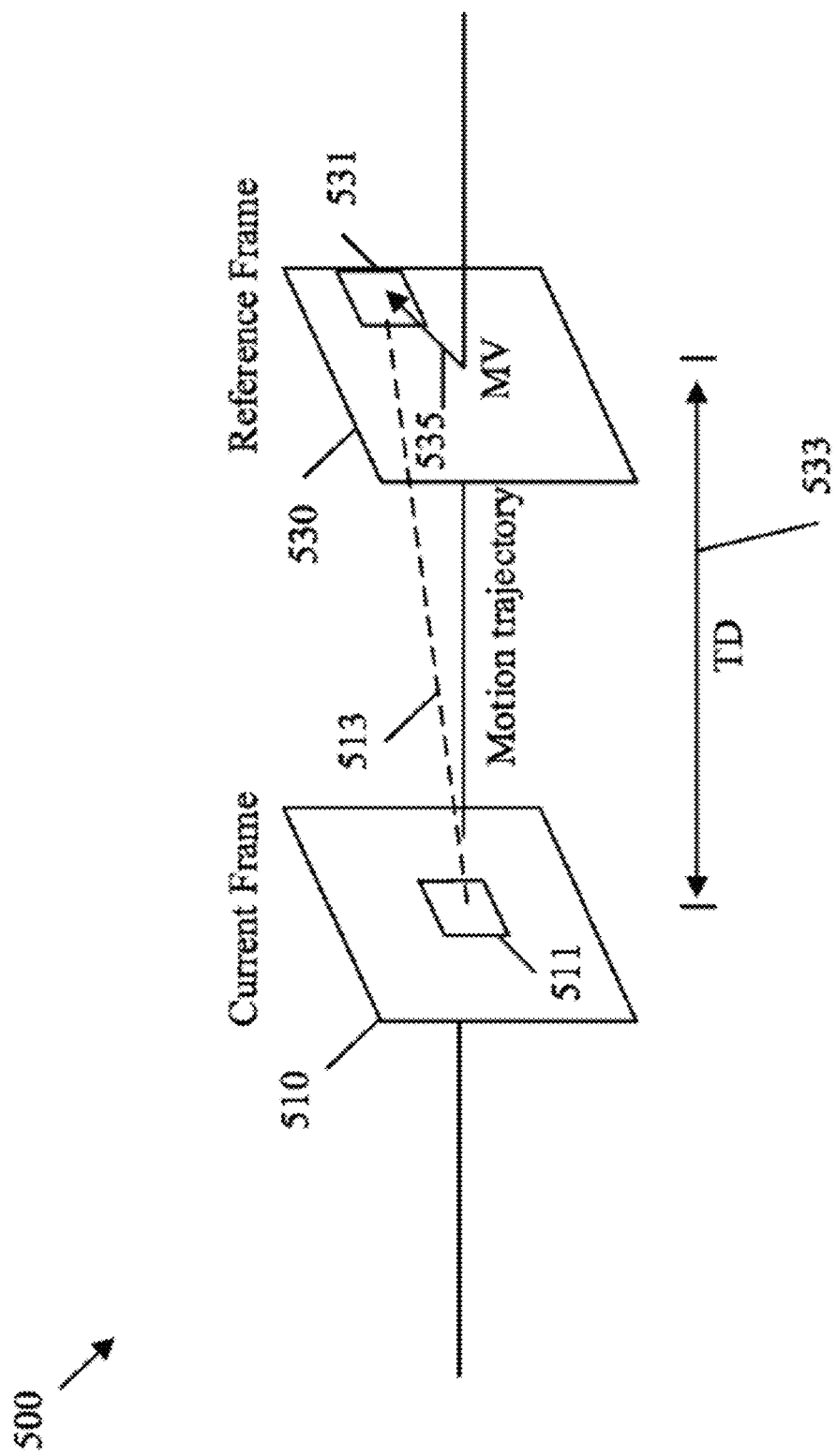
FIG. 5 is a schematic diagram illustrating an example of unidirectional inter-prediction.

FIG. 5 is a schematic diagram illustrating an example of unidirectional inter-prediction 500, for example as performed to determine motion vectors (MVs) at block compression step 105, block decoding step 113, motion estimation component 221, motion compensation component 219, motion compensation component 321, and/or motion compensation component 421.

Unidirectional inter-prediction 500 employs a reference frame 530 with a reference block 531 to predict a current block 511 in a current frame 510. The reference frame 530 may be temporally positioned after the current frame 510 as shown, but may also be temporally positioned before the current frame 510 in some examples. The current frame 510 is an example frame/picture being encoded/decoded at a particular time. The current frame 510 contains an object in the current block 511 that matches an object in the reference block 531 of the reference frame 530. The reference frame 530 is a frame that is employed as a reference for encoding a current frame 510, and a reference block 531 is a block in the reference frame 530 that contains an object also contained in the current block 511 of the current frame 510. The current block 511 is any coding unit that is being encoded/decoded at a specified point in the coding process. The current block 511 may be an entire partitioned block, or may be a sub-block in the affine inter-prediction case. The current frame 510 is separated from the reference frame 530 by some temporal distance (TD) 533. The TD 533 indicates an amount of time between the current frame 510 and the reference frame 530 in a video sequence. Over the time period represented by the TD 533, the object in the current block 511 moves from a position in the current frame 510 to another position in the reference frame 530 (e.g., the position of the reference block 531). For example, the object may move along a motion trajectory 513, which is a direction of movement of an object over time. A motion vector 535 describes the direction and magnitude of the movement of the object along the motion trajectory 513 over the TD 533. Accordingly, an encoded MV 535 and a reference block 531 provides information sufficient to reconstruct a current block 51 land position the current block 511 in the current frame 510.

Figure 6:
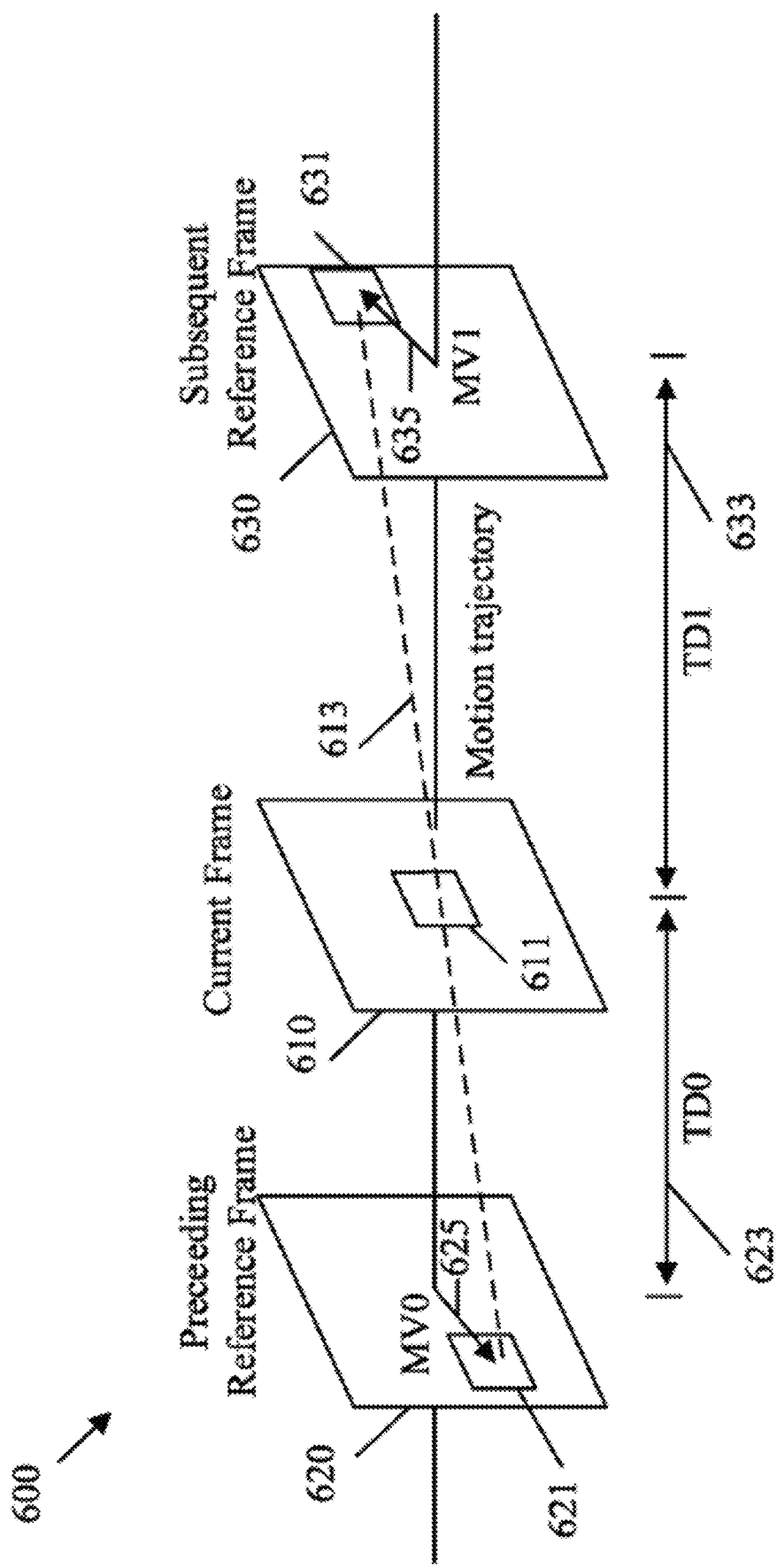
FIG. 6 is a schematic diagram illustrating an example of bidirectional inter-prediction

FIG. 6 is a schematic diagram illustrating an example of bidirectional inter-prediction 600, for example, as performed to determine MVs at block compression step 105, block decoding step 113, motion estimation component 221, motion compensation component 219, motion compensation component 321, and/or motion compensation component 421. For example, bidirectional inter-prediction 600 can be employed to determine motion vectors for a block in inter-prediction modes and/or to determine motion vectors for sub-blocks in affine inter-prediction mode.

Bidirectional inter-prediction 600 is similar to unidirectional inter-prediction 500, but employs a pair of reference frames to predict a current block 611 in a current frame 610. Hence, current frame 610 and current block 611 are substantially similar to current frame 510 and current block 511, respectively. The current frame 610 is temporally positioned between a preceding reference frame 620, which occurs before the current frame 610 in the video sequence, and a subsequent reference frame 630, which occurs after the current frame 610 in the video sequence. Preceding reference frame 620 and subsequent reference frame 630 are otherwise substantially similar to reference frame 530.

The current block 611 is matched to a preceding reference block 621 in the preceding reference frame 620 and to a subsequent reference block 631 in the subsequent reference frame 630. Such a match indicates that, over the course of the video sequence, an object moves from a position at the preceding reference block 621 to a position at the subsequent reference block 631 along a motion trajectory 613 and via the current block 611. The current frame 610 is separated from the preceding reference frame 620 by some preceding temporal distance (TD0) 623 and separated from the subsequent reference frame 630 by some subsequent temporal distance (TD1) 633. The TD0 623 indicates an amount of time between the preceding reference frame 620 and the current frame 610 in the video sequence. The TD1 633 indicates an amount of time between the current frame 610 and the subsequent reference frame 630 in the video sequence. Hence, the object moves from the preceding reference block 621 to the current block 611 along the motion trajectory 613 over a time period indicated by TD0 623. The object also moves from the current block 611 to the subsequent reference block 631 along the motion trajectory 613 over a time indicated by TD1 633.

A preceding motion vector (MV0) 625 describes the direction and magnitude of the movement of the object along the motion trajectory 613 over the TD0 623 (e.g., between the preceding reference frame 620 and the current frame 610). A subsequent motion vector (MV1) 635 describes the direction and magnitude of the movement of the object along the motion trajectory 613 over the TD1 633 (e.g., between the current frame 610 and the subsequent reference frame 630). As such, in bidirectional inter-prediction 600, the current block 611 can be coded and reconstructed by employing the preceding reference block 621 and/or the subsequent reference block 631, MV0 625, and MV1 635.

Intra-prediction.

Many schemes are employed in tandem to compress video data during the video coding process. For example, a video sequence is divided into image frames. The image frames are then partitioned into image blocks. The image blocks may then be compressed by inter-prediction (correlation between blocks in different frames) or intra-prediction (correlation between blocks in the same frame). In intra-prediction, a current image block is predicted from a reference line of samples. The reference line includes samples from adjacent image blocks, also called neighbor blocks. Samples from the current block are matched with samples from the reference line with the nearest luma (light) or chroma (color) values. The current block is coded as prediction modes that indicate the matching samples. The prediction modes include angular prediction modes, direct current (DC) mode, and planar mode. Differences between values predicted by the prediction modes and actual values are coded as residual values in a residual block.

Figure 7:
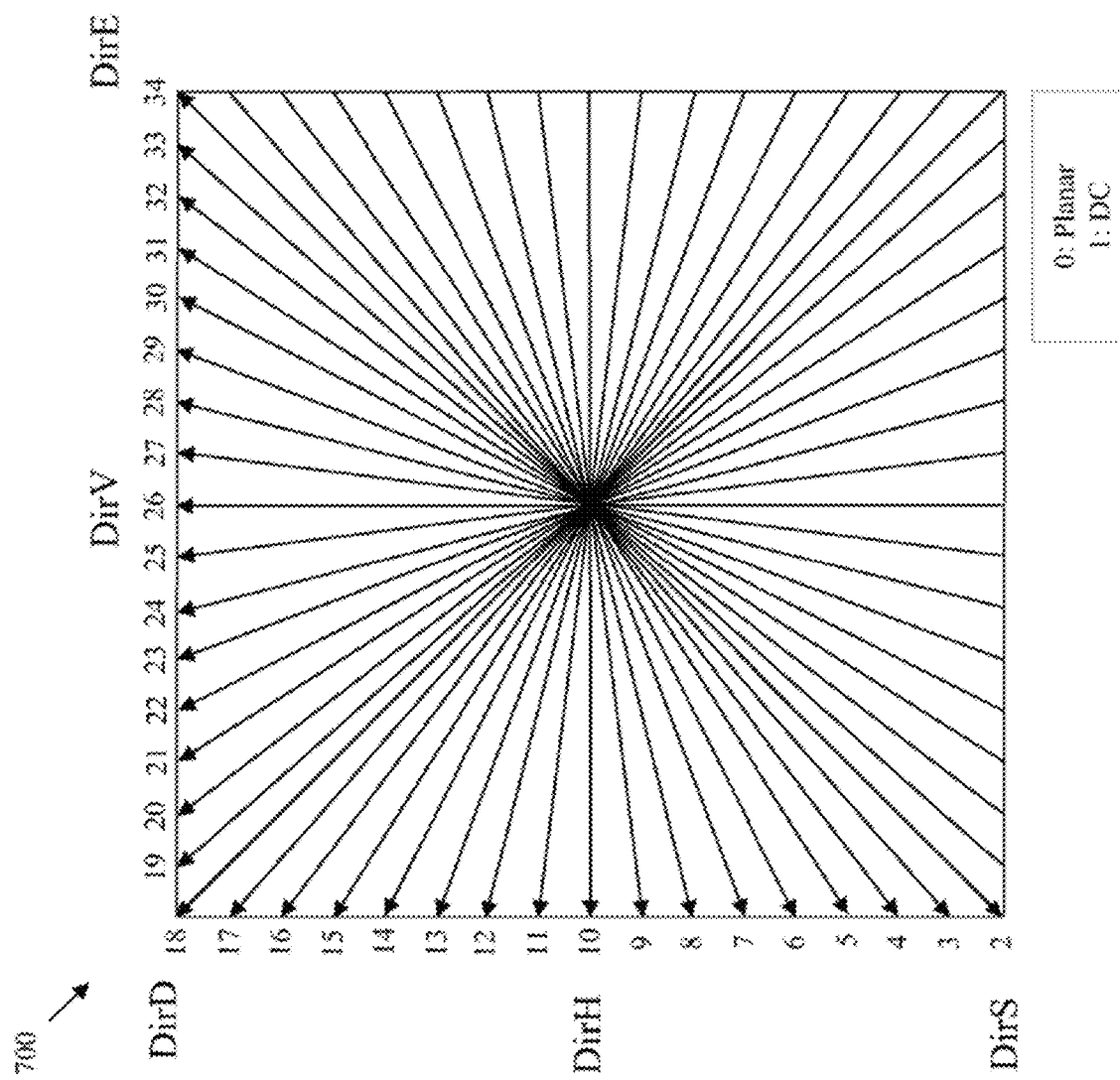
FIG. 7 is a schematic diagram illustrating example intra-prediction modes employed in video coding.

FIG. 7 is a schematic diagram illustrating example intra-prediction modes 700 employed in video coding. For example, intra-prediction modes 700 may be employed by steps 105 and 113 of method 100, intra-picture estimation component 215, and an intra-picture prediction component 217 of codec system 200, intra-picture prediction component 317 of encoder 300, and/or intra-picture prediction component 417 of decoder 400. Specifically, intra-prediction modes 700 can be employed to compress an image block into a prediction block containing a selected prediction mode and a remaining residual block.

As noted above, intra-prediction involves matching a current image block to a corresponding sample or samples of one or more neighboring blocks. The current image block can then be represented as a selected prediction mode index and a residual block, which is much smaller than representing all of the luma/chroma values contained in the current image block. Intra-prediction can be used when there is no available reference frame, or when inter-predication coding is not used for the current block or frame. The reference samples for intra-prediction may be derived from previously coded (or reconstructed) neighboring blocks in the same frame. Advanced Video Coding (AVC), also known as H.264 and H.265/HEVC both employ a reference line of boundary samples of adjacent blocks as reference sample for intra-prediction. In order to cover different textures or structural characteristics many different intra-prediction modes are employed. H.265/HEVC supports thirty-five intra-prediction modes 700 that spatially correlate a current block to one or more reference samples. Specifically, intra-prediction modes 700 include thirty-three directional prediction modes indexed as modes two through thirty-four, a DC mode indexed as mode one and a planar mode indexed as mod-ezero.

During encoding, the encoder matches the luma/chroma values of a current block with the luma/chroma values of corresponding reference samples in a reference line across the edges of neighboring blocks. When the best match is found with one of the reference lines, the encoder selects one of the directional intra-prediction modes 700 that points to the best matching reference line. For clarity of discussion, acronyms are employed below to reference particular directional intra-prediction modes 700. DirS denotes the starting directional intra-prediction mode when counting clockwise from the bottom left (e.g., mode two in HEVC). DirE denotes the ending directional intra-prediction mode when counting clockwise from the bottom left (e.g., mode thirty-four in HEVC). DirD denotes the middle directional intra coding mode when counting clockwise from the bottom left (e.g., mode eighteen in HEVC). DirH denotes a horizontal intra prediction mode (e.g., mode ten in HEVC). DirV denotes a vertical intra prediction mode (e.g., mode twenty-six in HEVC).

As discussed above, DC mode acts as a smoothing function and derives a prediction value of a current block as an average value of all the reference samples in the reference line traversing the neighboring blocks. Also as discussed above, planar mode returns a prediction value that indicates a smooth transition (e.g., constant slope of values) between samples at the bottom and top left or top left and top right of the reference line of reference samples.

For Planar, DC, and prediction modes from DirH to DirV, the samples in both the top row of the reference line and the left column of the reference line are used as reference samples. For prediction modes with prediction directions from DirS to DirH (including DirS and DirH), the reference samples in the previously coded and reconstructed neighboring blocks on the left column of the reference line are used as reference samples. For prediction modes with prediction directions from DirV to DirE (including DirV and DirE), the reference samples of the previously coded and reconstructed neighboring blocks on the top row of the reference line are used as reference samples.

Figure 8:
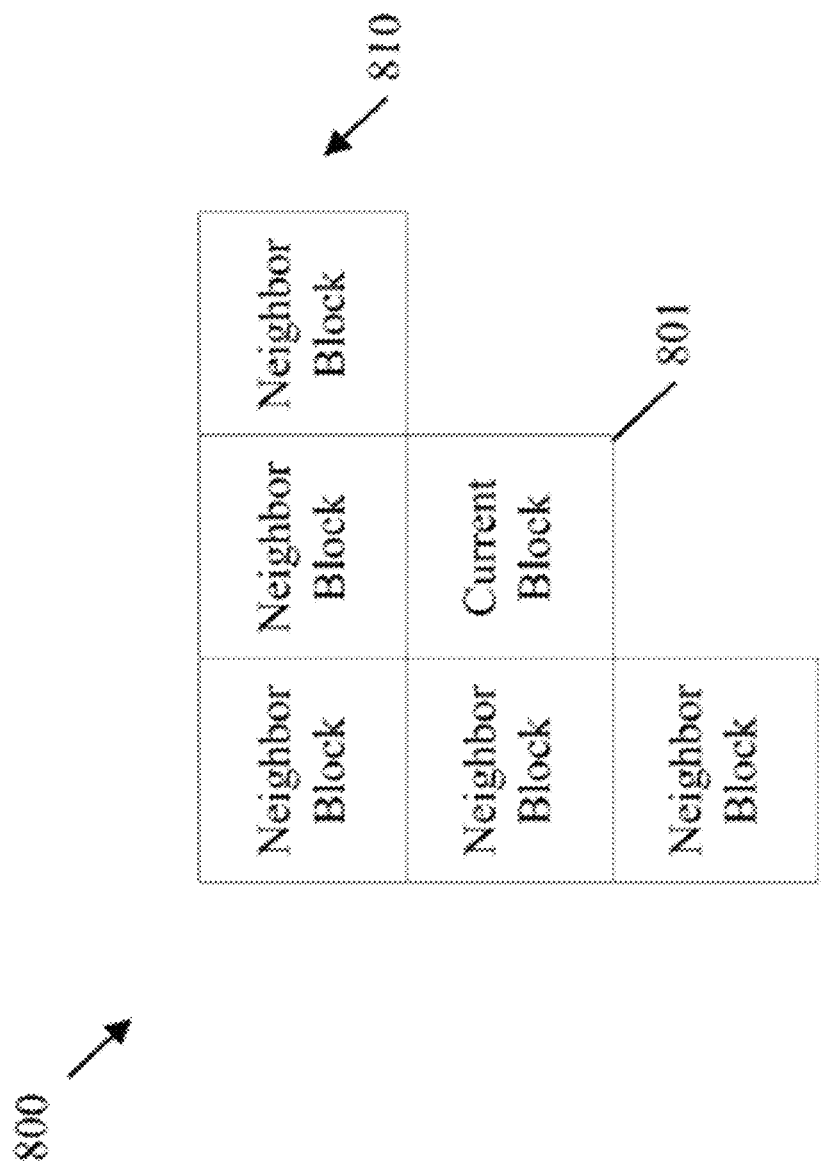
FIG. 8 is a schematic diagram illustrating an example of directional relationships of blocks in video coding.

FIG. 8 is a schematic diagram illustrating an example of directional relationships of blocks 800 in video coding. For example, the blocks 800 may be employed when selecting intra-prediction modes 500. Hence, blocks 800 may be employed by steps 105 and 113 of method 100, intra-picture estimation component 215, and an intra-picture prediction component 217 of codec system 200, intra-picture prediction component 317 of encoder 300, and/or intra-picture prediction component 417 of decoder 400. In video coding, blocks 800 are partitioned based on video content and hence may include many rectangles and squares of varying shapes and sizes. Blocks 800 are depicted as squares for purposes of explanation and are hence simplified from actual video coding blocks to support clarity of discussion.

The blocks 800 contain a current block 801 and neighbor blocks 810. The current block 810 is any block being coded at a specified time. The neighbor blocks 810 are any blocks immediately adjacent to the left edge or top edge of the current block 801. Video coding generally proceeds from top left to bottom right. As such, the neighbor blocks 810 may be been encoded and reconstructed prior to coding of the current block 801. When coding the current block 801, the encoder matches the luma/chroma values of the current block 801 with a reference sample (or samples) from a reference line traversing the edges of the neighboring blocks 810. The match is then employed to select an intra-prediction mode, for example from intra-prediction modes 700 that point to the matched sample (or samples when DC or planar mode is selected). The selected intra-prediction mode then indicates that the luma/chroma values of the current block 801 are substantially similar to the reference sample corresponding to selected intra-prediction mode. Any differences can be retained in a residual block. The selected intra-prediction mode is then encoded in a bitstream. At the decoder, the current block 801 can be reconstructed by employing the luma/chroma values of the reference samples in the selected reference line in the neighboring block 810 that corresponds to the selected intra-prediction mode (along with any residual information from the residual block).

In-loop Filters.

Video coding schemes subdivide video signals into image frames, and then subdivide the image frames into various types of blocks. The image blocks are then compressed. This approach may create visual artefacts when the compressed video signal is reconstructed and displayed. For example, the image compression process can artificially add blocky shapes. This is known as blocking, and generally occurs at block partition boundaries. In addition, non-linear signal dependent rounding error, known as quantization noise, may also be artificially added to a compressed image. Various filters may be employed to correct for such artefacts. The filters may be applied to reconstructed frames in post processing. Post processing occurs after significant portions of the compressed video signal have been reconstructed and immediately prior to display to a user. The filters may also be applied as part of the compression/decompression process by employing a mechanism called in-loop filtering. In-loop filtering is a filtering scheme that applies filters to reconstructed video images during the encoding and/or decoding process to support more accurate compression between related images. For example, inter-prediction encodes an image frame based on a previous and/or subsequent image frame. At an encoder, a compressed image is reconstructed and filtered via in-loop filtering so that the reconstructed image provides a more accurate image for use in encoding previous/subsequent image frame(s) via inter-prediction. At a decoder, a compressed image is reconstructed and filtered via in-loop filtering both to create a more accurate image for viewing by an end user and to support more accurate inter-prediction. In-loop, filtering employs several filters such as a deblocking filter, a sample adaptive offset (SAO) filter, and an adaptive loop filter. In-loop filtering can also include a noise suppression filter.

Figure 9:
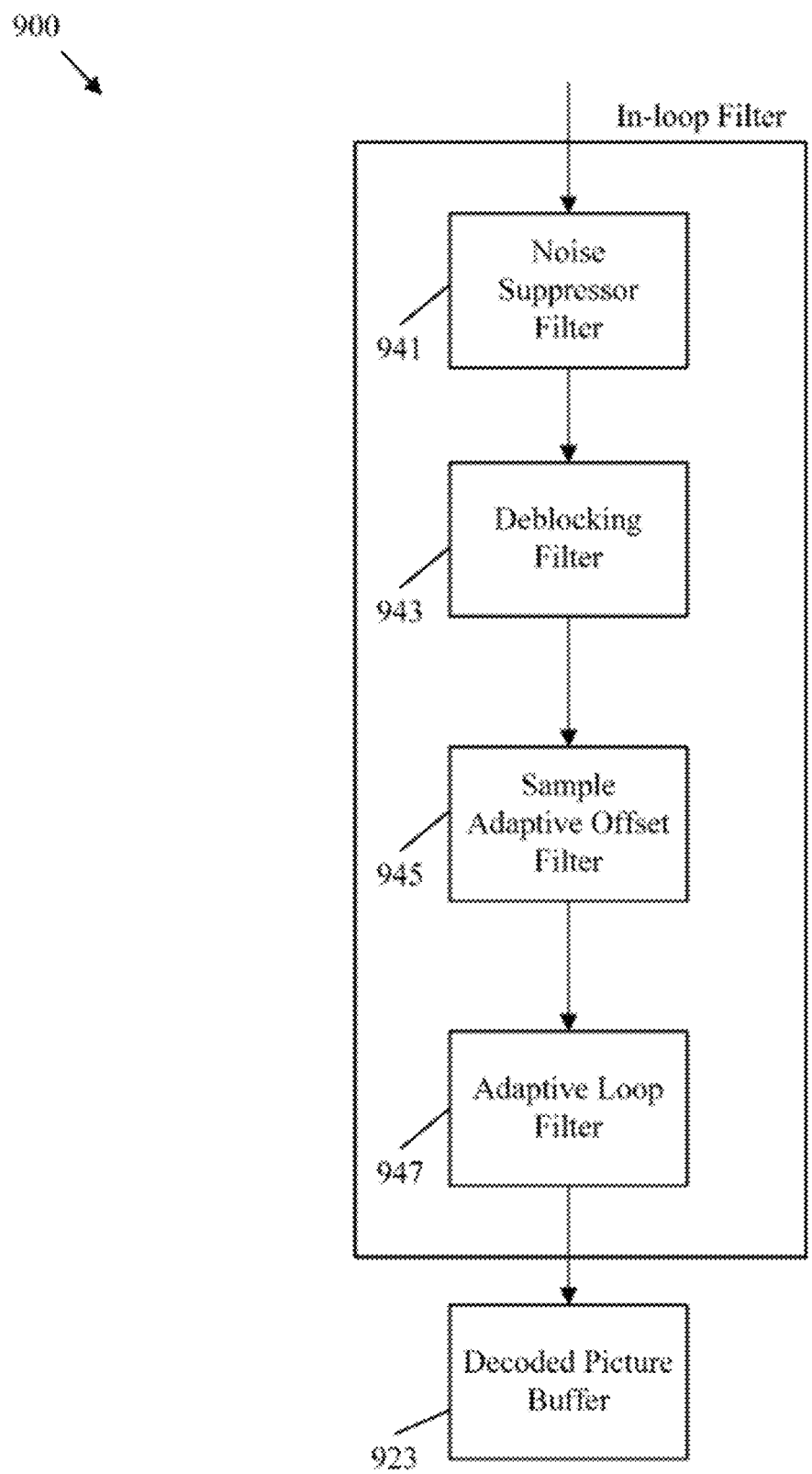
FIG. 9 is a block diagram illustrating an example in-loop filter.

FIG. 9 is a block diagram illustrating an example in-loop filter 900. In-loop filter 900 may be employed to implement in-loop filters 225, 325, and/or 425. The in-loop filter 900 includes a noise suppression filter 941; a deblocking filter 943, a sample adaptive offset (SAO) filter 945, and an adaptive loop filter 947. The filters of in-loop filter 900 are applied in sequence to reconstructed image blocks and/or a residual block.

The noise suppression filter 941 is configured to remove quantization noise caused by image compression. Specifically, the noise suppression filter 941 is employed to remove artefacts that occur at edges in the image. For example, image compression may create distinct and incorrect color/light values adjacent to sharp transitions (edges) between different color/light patches in an image. This is referred to as ringing, and is caused by application of transforms to high frequency portions of the image data that are associated with sharp edges. The noise suppression filter 941 is employed to mitigate such ringing artefacts. The noise suppression filter 941 operates in both the spatial domain (e.g., spatial orientation of pixels) and the frequency domain (e.g., relationship of transformed coefficient values relating to pixel data). At the encoder, the noise suppression filter 941 partitions a reconstructed frame into reference macroblocks. Such blocks can also be sub-divided into smaller reference blocks. The noise suppression filter 941 first generates an application map indicating the portions of the frame that should be filtered based on an estimated amount of quantization noise at the block. The noise suppression filter 941 then employs a matching component to determine, for each reference block as indicated by the application map, a set of patches that are similar to the corresponding reference block, where similar indicates chroma/luma values are within a predetermined range. The noise suppression filter 941 then groups the patches into clusters and may employ a two dimensional (2D) transform to transform the clusters into the frequency domain resulting in frequency domain patches. The noise suppression filter 941 may also employ a reverse 2D transform to convert the frequency domain patches back into the spatial domain.

The deblocking filter 943 is configured to remove block shaped edges created by the blocked based inter and intra prediction. The deblocking filter 943 scans an image portion (e.g., image slice) for discontinuities in chroma and/or luma values occurring at partition boundaries. The deblocking filter 943 then applies a smoothing function to the block boundaries to remove such discontinuities. The strength of the deblocking filter 943 may be varied depending on the spatial activity (e.g., variance of luma/chroma components) occurring in an area adjacent to the block boundaries.

The SAO filter 945 is configured to remove artefacts related to sample distortion caused by the encoding process. The SAO filter 945 at an encoder classifies deblocked samples of a reconstructed image into several categories based on relative deblocking edge shape and/or direction. An offset is then determined and added to the samples based on the categories. The offsets are then encoded in the bitstream and employed by the SAO filter 945 at the decoder. The SAO filter 945 removes banding artefacts (bands of values instead of smooth transitions) and ringing artefacts (spurious signals near sharp edges).

The adaptive loop filter 947, at the encoder, is configured to compare a reconstructed image to an original image. The adaptive loop filter 947 determines coefficients that describe the differences between the reconstructed image and the original image, for example via a Wiener based adaptive filter. Such coefficients are encoded in the bitstream and employed at the adaptive loop filter 947 at the decoder to remove the differences between the reconstructed image and the original image. While the adaptive loop filter 947 is effective in correcting artefacts, greater differences between the reconstructed image and the original image result in a greater number of coefficients to be signaled. This in turn creates a larger bitstream and hence reduces the effectiveness of compression. As such, minimization of differences by other filters prior to applying the adaptive loop filter 947 results in improved compression.

Partitioning.

Video coding employs an encoder to compress media files and a decoder to reconstruct the original media files from the compressed media files. Video coding employs various standardized processes to ensure that any decoder employing the standardized process can consistently reproduce a media file as compressed by any encoder also employing the standardized process. For example, an encoder and a decoder may both employ a coding standard such as High efficiency video coding (HEVC), which is also known as H.265. At an encoder, a video signal is separated into frames. Frames are then partitioned into image blocks containing groups of pixels. The image blocks are then compressed, filtered, and encoded into a bitstream. The bitstream may then be transmitted to a decoder, which reconstructs the video signal for display to an end user.

Partitioning systems are configured to split image blocks into sub-blocks. For example, a tree structure employing various split modes can be employed to split a node (e.g., a block) into child nodes (e.g., sub-blocks). Different split modes can be employed to obtain different partitions. Further, split modes can also be applied recursively to further subdivide nodes. Such application of the split modes result in various partition patterns.

Figure 10:
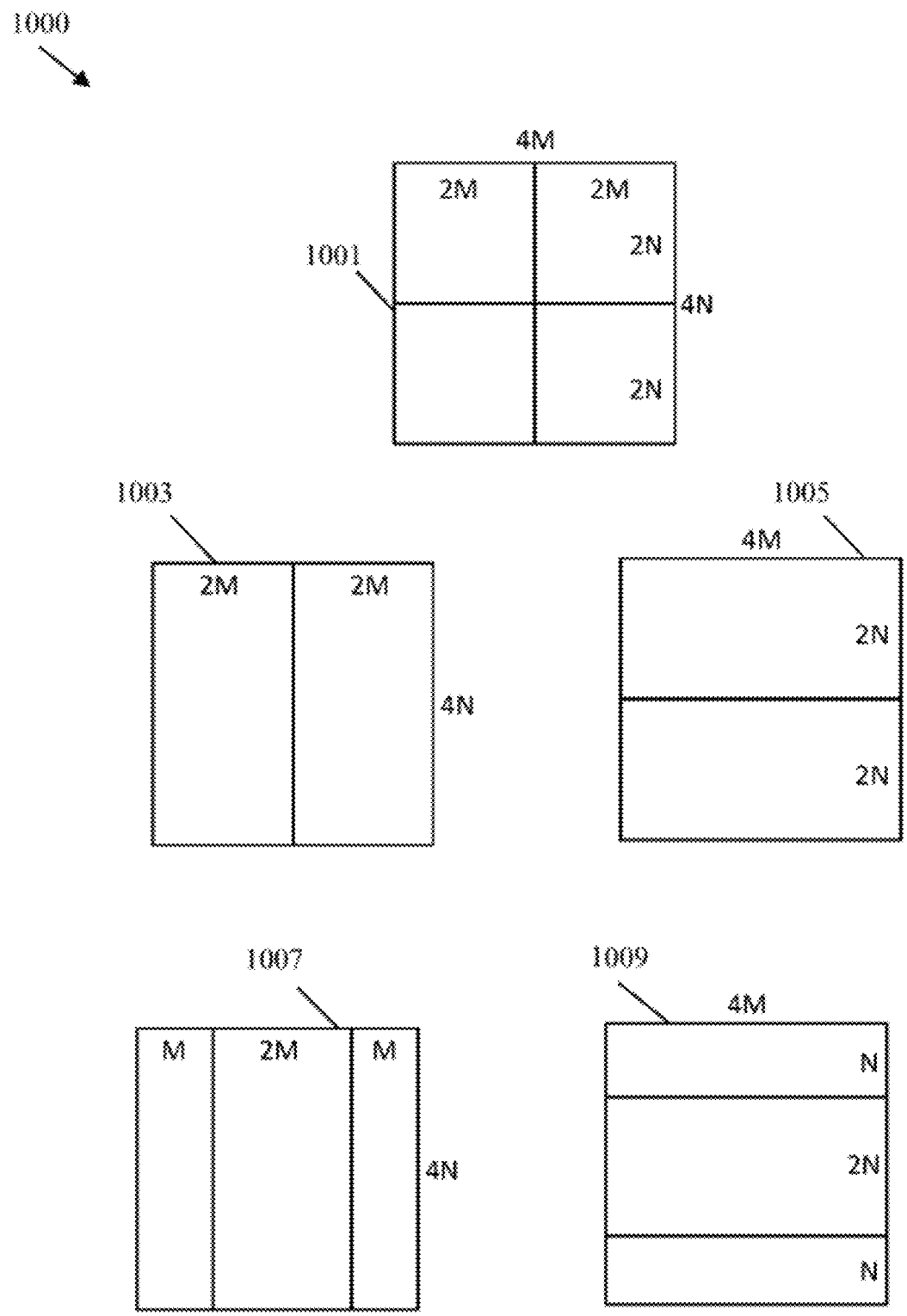
FIG. 10 illustrates example split modes employed in block partitioning.

FIG. 10 illustrates example split modes 1000 employed in block partitioning. A split mode 1000 is a mechanism to split a parent node (e.g., an image block) into a plurality of child nodes (e.g., image sub-blocks) during partitioning. Split modes 1000 include a quad-tree (QT) split mode 1001, a vertical binary tree (BT) split mode 1003, a horizontal BT split mode 1005, a vertical triple tree (TT) split mode 1007, and a horizontal TT split mode 1009. The QT split mode 1001 is a tree structure for block partitioning in which a node of size 4M×4N is split into four child nodes of size M×N, where M indicates block width and N indicates block height. The vertical BT split mode 1003 and horizontal BT split mode 1005 are tree structures for block partitioning in which a node of size 4M×4N is vertically split into two child nodes of size 2M×4N or horizontally split into two child nodes of size 4M×2N, respectively. The vertical TT split mode 1007 and horizontal TT split mode 1009 are tree structures for block partitioning in which a node of size 4M×4N is vertically split into three child nodes of size M×4N, 2M×4N and M×4N; or horizontally split into three child nodes of size 4M×N, 4M×2N and 4M×N, respectively. Among the three child nodes, the largest node is positioned in the center.

Split modes 1000 may also be applied recursively to further divide the blocks. For example a quad-tree binary-tree (QT-BT) can be created by partitioning a node with QT split mode 1001, and then partitioning each child node (sometimes referred to as quad-tree leaf nodes) with a vertical BT split mode 1003 and/or a horizontal BT split mode 1005. Further, a quad-tree triple tree (QT-TT) can be created by partitioning a node with a quad-tree split, and then partitioning the resulting child nodes with the vertical TT split mode 1007 and/or the horizontal TT split mode 1009.

HEVC operates on a Joint Exploration Model (JEM) application. In JEM, QT-BT block partitioning is employed to partition a coding tree unit (CTU) into a plurality of blocks. TT block partitioning has also been proposed for inclusion into JEM to further enrich block partition types. In video coding based on QT, QT-BT, QT-TT block partitioning split modes, a coding or prediction block in depth K may be split into a number N of smaller coding or prediction blocks of depth K+1 by a BT, TT or QT split mode, where N is set to two, three, or four, respectively. The partition patterns of the split modes are shown in FIG. 10, with the partition patterns indicating the size and position of two or more child nodes split from a parent node.

Transform.

Video coding employs an encoder to compress media files and a decoder to reconstruct the original media files from the compressed media files. Video coding employs various standardized processes to ensure that any decoder employing the standardized process can consistently reproduce a media file as compressed by any encoder also employing the standardized process.

For example, an encoder and a decoder may both employ a coding standard such as High efficiency video coding (HEVC), which is also known as H.265. H. 265 are based on a prediction and transform framework. At an encoder, video files are separated into frames. Frames are then sub-divided into image blocks containing groups of pixels. Image blocks are further decomposed into prediction blocks containing prediction information, such as prediction modes and motion vector information, and residual blocks containing residual information, such as transform modes, transform coefficients, and quantization parameters. A prediction block and a residual block employ less storage space than an image block, but can be employed by a decoder to reconstruct an image block. The prediction blocks and residual blocks are coded into a bitstream and transmitted to decoder and/or stored for later transmission upon request. At a decoder, the prediction information and the residual information are parsed. The parsed prediction information is then employed to generate prediction samples by employing intra-prediction or inter-prediction. Intra- prediction employs reconstructed image blocks to predict other image blocks in the same frame. Inter-prediction employs reconstructed image blocks to predict other image blocks between adjacent frames. Further, the residual information is employed to generate residual samples, for example by sequentially applying inverse quantization and inverse transforms. The prediction samples and the residual samples are combined to obtain reconstructed samples that correspond to the image blocks coded by the encoder (e.g., for display to an end user on a monitor).

Spatial varying transform (SVT) is a mechanism employed to further improve video coding efficiency. SVT employs a transform block to further compress the residual block. Specifically, a rectangular residual block include a width and height h (e.g., w×h). A transform block is selected that is smaller than the residual block. Hence, the transform block is employed to transform a corresponding part of the residual block, and leave the remainder of the residual block without additional coding/compression. The rationale behind SVT is that residual information may not be distributed evenly in a residual block. Using a smaller transform block with an adaptive position can capture the majority of the residual information in the residual block, without requiring the entire residual block be transformed. This approach may achieve better coding efficiency than transforming all the residual information in the residual block in some cases. As the transform block is smaller than the residual block, SVT employs a mechanism for signaling the position of the transform relative to the residual block. Such position signaling increases the overall signaling overhead of the coding process, and hence reduces the efficiency of the compression. Additionally, employing the same type of transform block in all cases may not lead to beneficial results in some cases.

Figure 11:
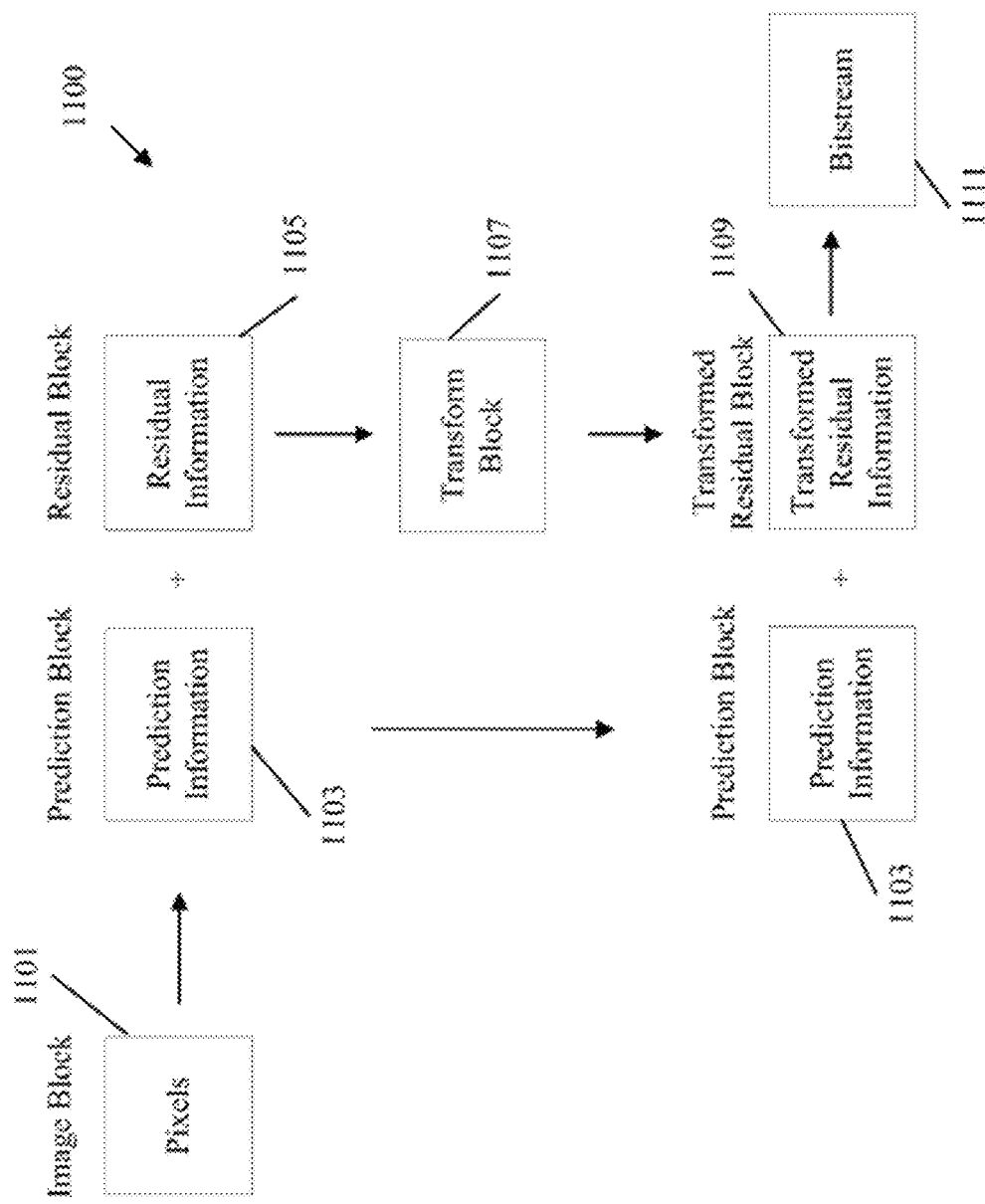
FIG. 11 is a schematic diagram of an example video encoding mechanism.

FIG. 11 is a schematic diagram of an example video encoding mechanism 1100. An encoder from one or more frames can obtain an image block 1101. For example, an image may be split into a plurality of rectangular image regions. Each region of the image corresponds to a Coding Tree Unit (CTU). A CTU is partitioned into a plurality of blocks, such as the coding units in HEVC. Block partition information is then encoded in a bitstream 1111. Accordingly, the image block 1101 is a partitioned portion of an image and contains pixels that represent luma components and/or chroma components at a corresponding portion of the image. During encoding, the image block 1101 is encoded as a prediction block 1103 containing prediction information such as prediction modes for intra-prediction and/or motion vectors for inter-prediction. Encoding the image block 1101 as a prediction block 1103 may then leave a residual block 1105 containing residual information indicating the difference between the prediction block 303 and the image block 301.

It should be noted that an image block 1101 might be partitioned as a coding unit that contains one prediction block 1103 and one residual block 1105. The prediction block 1103 may contain all prediction samples of the coding unit, and the residual block 1105 may contain all residual samples of the coding unit. In such a case, the prediction block 1103 is of the same size as the residual block 1105. In another example, the image block 1101 may be partitioned as a coding unit that contains two prediction blocks 1103 and one residual block 1105. In such a case, each prediction block 1103 contains a portion of the prediction samples of the coding unit, and the residual block 1105 contains all of the residual samples of the coding unit. In yet another example, the image block 1101 is partitioned into a coding unit that contains 2 prediction blocks 1103 and four residual blocks 1105. The partition pattern of the residual blocks 1105 in a coding unit may be signaled in the bitstream 1111. Such position patterns may include Residual Quad-Tree (RQT) in HEVC. Further, an image block 1101 may contain only luma components (e.g., light), denoted as Y components, of image samples (or pixels). In other cases, the image block 1101 may contain Y, U. and V components of image samples, where U and V indicate chrominance components (e.g., color) in a blue luminance and red luminance (UV) colorspace.

Transforms may be employed to further compress the information. Specifically, a transform block 1107 may be employed to further compress the residual block 1105. The transform block 1107 contains a transform, such as inverse Discrete Cosine Transform (DCT) and/or inverse Discrete Sine Transform (DST). The difference between the prediction block 1103 and the image block 1101 is the fit to the transform by employing transform coefficients. By indicating the transform mode of the transform block 1107 (e.g., inverse DCT and/or inverse DST) and the corresponding transform coefficients, the decoder can reconstruct the residual block 1105. When exact reproduction is not required, the transform coefficients can be further compressed by rounding certain values to create a better fit for the transform. This process is known as quantization and is performed according to quantization parameters that describe the allowable quantization. Accordingly, the transform modes, transform coefficients, and quantization parameters of the transform block 1107 are stored as transformed residual information in a transformed residual block 1109, which may also be referred to simply as a residual block in some cases.

The prediction information of the prediction block 1103 and the transformed residual information of the transformed residual block 1109 can then be encoded in a bitstream 1111. The bitstream 1111 can be stored and/or transmitted to a decoder. The decoder can then perform the process in reverse to recover the image block 1101. Specifically, the decoder can employ the transformed residual information to determine the transform block 1107. The transform block 1107 can then be employed in conjunction with the transformed residual block 1109 to determine the residual block 1105. The residual block 1105 and the prediction block 1103 can then be employed to reconstruct the image block 1101. The image block 1101 can then be positioned relative to other decoded image blocks 1101 to reconstruct frames and position such frames to recover the encoded video.

It should be noted that some prediction blocks 1103 could be encoded without resulting in a residual block 1105. However, such a case does not result in the use of a transform block 1107 and hence is not discussed further. Transform blocks 1107 may be employed for inter-predicted blocks or intra-predicted blocks. Further, transform blocks 1107 may be employed on residual blocks 1105 generated by specified inter-prediction mechanisms (e.g., translation model based motion compensation), but may not be employed to residual blocks 1105 generated by other specified inter-prediction mechanisms (e.g., affine model based motion compensation).

Figure 12:
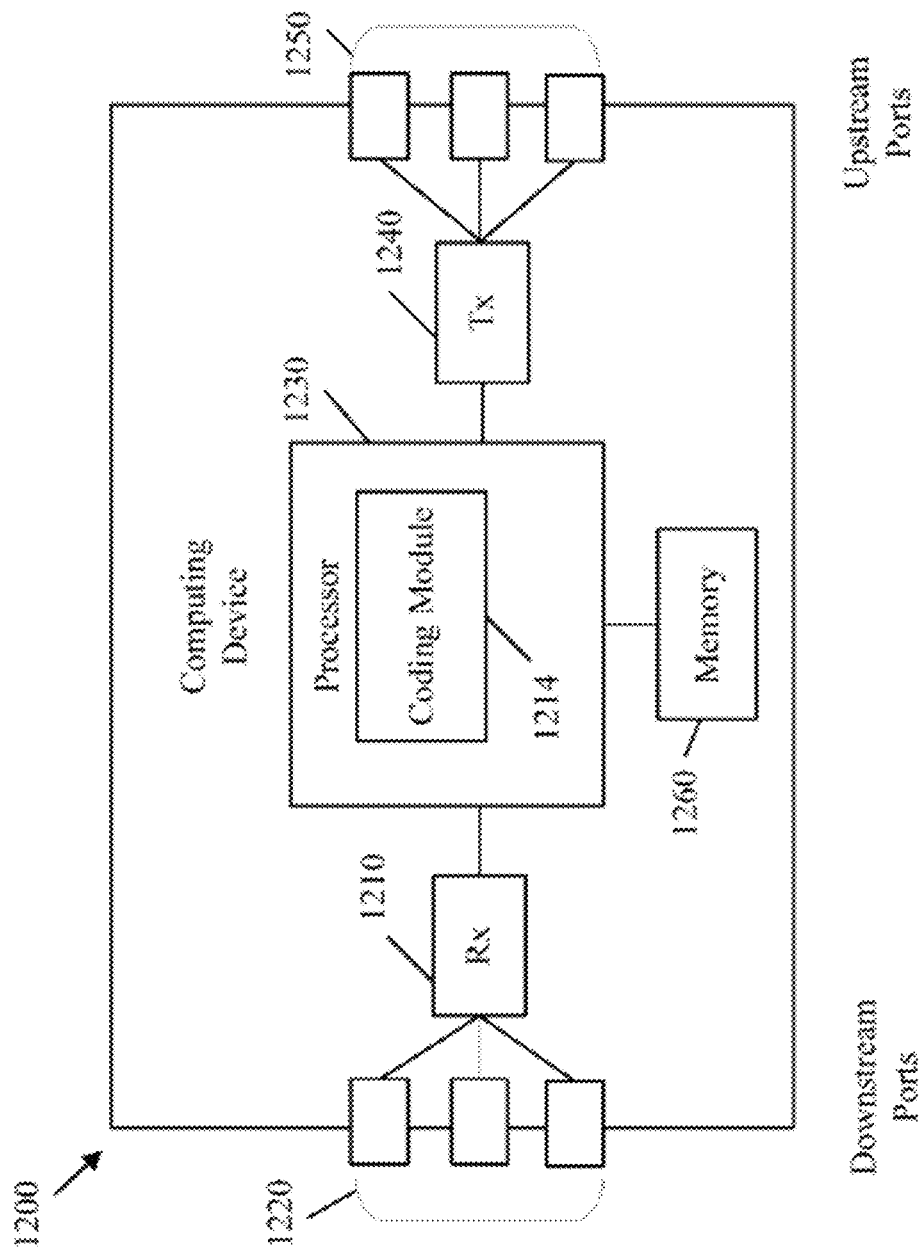
FIG. 12 is a schematic diagram of a computing device for video coding.

FIG. 12 is a schematic diagram of an example-computing device 1200 for video coding according to an embodiment of the disclosure. The computing device 1200 is suitable for implementing the disclosed embodiments as described herein. The computing device 1200 comprises ingress ports 1220 and receiver units (Rx) 1210 for receiving data; a processor, logic unit, or central processing unit (CPU) 1230 to process the data; transmitter units (TX) 1240 and egress ports 1250 for transmitting the data, a memory 1260 for storing the data. The computing device 1200 may also comprise optical-to-electrical (OE) components and electrical-to-optical (EO) components coupled to the ingress ports 1220, the receiver units 1210, the transmitter units 1240, and the egress ports 1250 for egress or ingress of optical or electrical signals. The computing device 1200 may also include wireless transmitters and/or receivers in some examples.

The processor 1230 is implemented by hardware and software. The processor 1230 may be implemented as one or more CPU chips, cores (e.g., as a multi-core processor), field programmable gate arrays (FPGAs), application specific integrated circuits (ASICs), and digital signal processors (DSPs). The processor 1230 is in communication with the ingress ports 1220, receiver units 1210, transmitter units 1240, egress ports 1250, and memory 1260. The processor 1230 comprises a coding module 1214. The coding module 1214 implements the disclosed embodiments described above. For instance, the coding module 1214 implements, processes, prepare, or provide the various coding operations. The inclusion of the coding module 1214 therefore provides a substantial improvement to the functionality of the computing device 1200 and effects a transformation of the computing device 1200 to a different state. Alternatively, the coding module 1214 is implemented as instructions stored in the memory 1260 and executed by the processor 1230 (e.g., as a computer program product stored on a non-transitory medium).

The memory 1260 comprises one or more disks, tape drives, and solid-state drives and may be used as an overflow data storage device, to store programs when such programs are selected for execution, and to store instructions and data that are read during program execution. The memory 1260 may be volatile and/or non-volatile and may be read-only memory (ROM), random access memory (RAM), ternary content-addressable memory (TCAM), and/or static random-access memory (SRAM). The computing device 1200 may also input/output (I/O) device for interacting with an end user. For example, the computing device 1200 may include a display, such as a monitor, for visual output, speakers for audio output, and a key board/mouse/trackball, etc. for user input.

Figure 13:
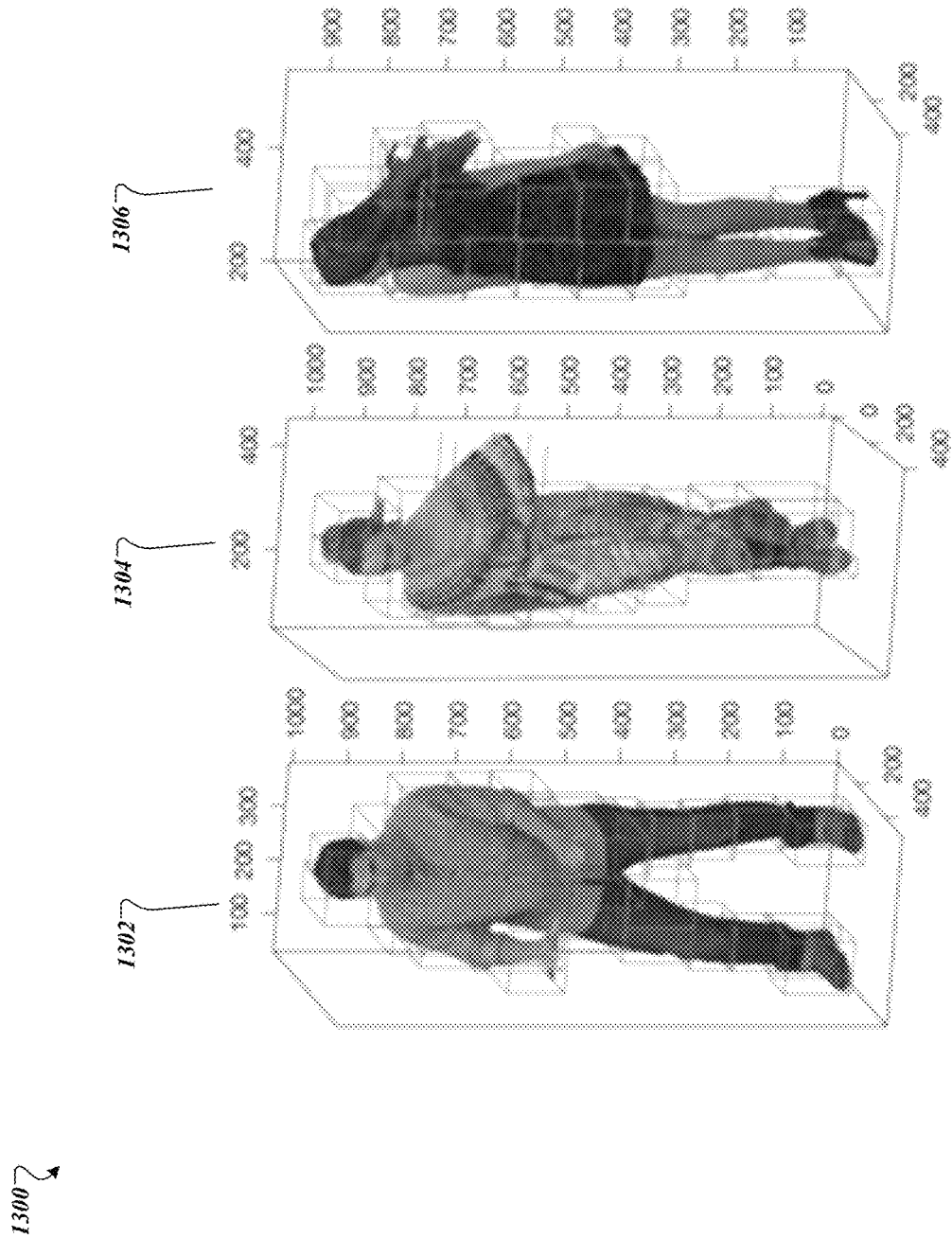
FIG. 13 is an example of a system illustrating point cloud media.

FIG. 13 is an example of a system 1300 illustrating point cloud media. In particular, the system 1300 illustrates various examples of a frame of point cloud media. The examples include a man 1302, a front facing woman 1304, and a rear-facing woman 1306. In some implementations, the system 1300 can include more or less examples of point cloud media. The point cloud media can include virtual representations of objects or people and their corresponding movements over a period of time in a three-dimensional (3-D) space.

Typically, point cloud media includes a set of data points in the 3-D space that outline an external surface of a 3-D object. For example, the objects can include a human, an item of manufacture, and a real-world object. The objects can be recorded in real time by a camera, for example, and virtually represented on a display or a projection screen in three dimensional space. A frame of point cloud media can include a 3-D representation of the object at a particular point in time. Continuous frames of point cloud media represent a dynamic representation of point cloud media.

The following definitions of acronyms are described: Group of Frames (GoF)—a set of point clouds registered in a fixed moment of time used for further processing. Group of Pictures (GoP)—a set of projections derived from point clouds that are used for video compression encoding. Point cloud compression (PCC)—a technique for compressing point cloud media for transmission.

Video-based PCC codec solution is based on segmentation of a 3-D point cloud data into 2-D projection patches. Video-based PCC is widely used in content such as immersive 6 degrees of freedom, dynamic AR/VR objects, cultural heritage, GIS, CAD, autonomous navigation, etc.

Point cloud media has become an integral part in a wide variety of applications, including the entertainment industry, intelligent automobile navigation industry, geospatial inspection, 3-D modeling of real-world objects and visualizations. In each of these application, various client devices can display and illustrate point cloud media. Considering the non-uniform sampling geometry, it is beneficial to have compact representations for storage and transmission of such data.

For example, client devices can use point cloud media to create 3-D computer animated drawing (CAD) models for manufactured parts, for metrology and quality inspection, and for a multitude of visualization, animation, rendering, and mass customization applications. In some examples, point cloud media can also be used to represent volumetric data, as is often performed in medical imaging, such as when visualizing the amount of space taken by a bone, an arm, or a leg, to name a few examples.

Compared with existing 3-D presentations, an irregular point cloud surface, such as a point cloud surface outlining a human, is more general and applicable for a wider range of sensors and data acquisition strategies. For example, in the cases of 3-D presentation in the virtual reality world or remote rendering in a telepresence environment, the rendering of virtual figures and real-time instructions are processed as dense point cloud data sets. For example, in the examples that the man 1302, the front facing woman 1304, and the rear-facing woman 1306 are presented in the virtual reality world over the telepresence environment, each of these single point cloud frames would be processed as a dense point cloud data set.

System 1300 illustrates different objects represented by a frame of point cloud media at a particular point in time. A device, such as a client device, can display continuous frames of point cloud media over a period of time. In some examples, the device can display point cloud media in an immersive six degrees of freedom (6 DoF) environment, dynamic augmented reality (AR) and virtual reality (VR) environments, cultural heritage environments, geographic information system (GIS) environments, computer-aided design (CAD), and in autonomous navigation systems.

The devices that can receive, display, and transmit the point cloud media can include a client device, such as a personal computer, a handheld device, a television, a navigation system, or other devices that can display point cloud media. In some implementations, these devices can store the point cloud media within its internal memory or store the point cloud media in some external storage device. Because storing point cloud media requires a significant amount of storage space, typically, point cloud media is stored and accessed on an external storage device.

For client devices to capture and relay point cloud media, the client devices can rely on multi-sampling techniques and data compression techniques to reduce the bandwidth required to store and/or transmit the point cloud media. In some cases, storing and transmitting dynamic representations of point cloud media is complicated due to the sheer size of a single frame of point cloud media. For example, a single frame of point cloud media can include a large amount of data, for example, such as hundreds of gigabytes. Thus, storing and transmitting multiple frames of point cloud media require data compression and encoding techniques to ensure that large amounts of frames of point cloud media is properly transmitted across various mediums that may introduce data loss.

Figure 14:
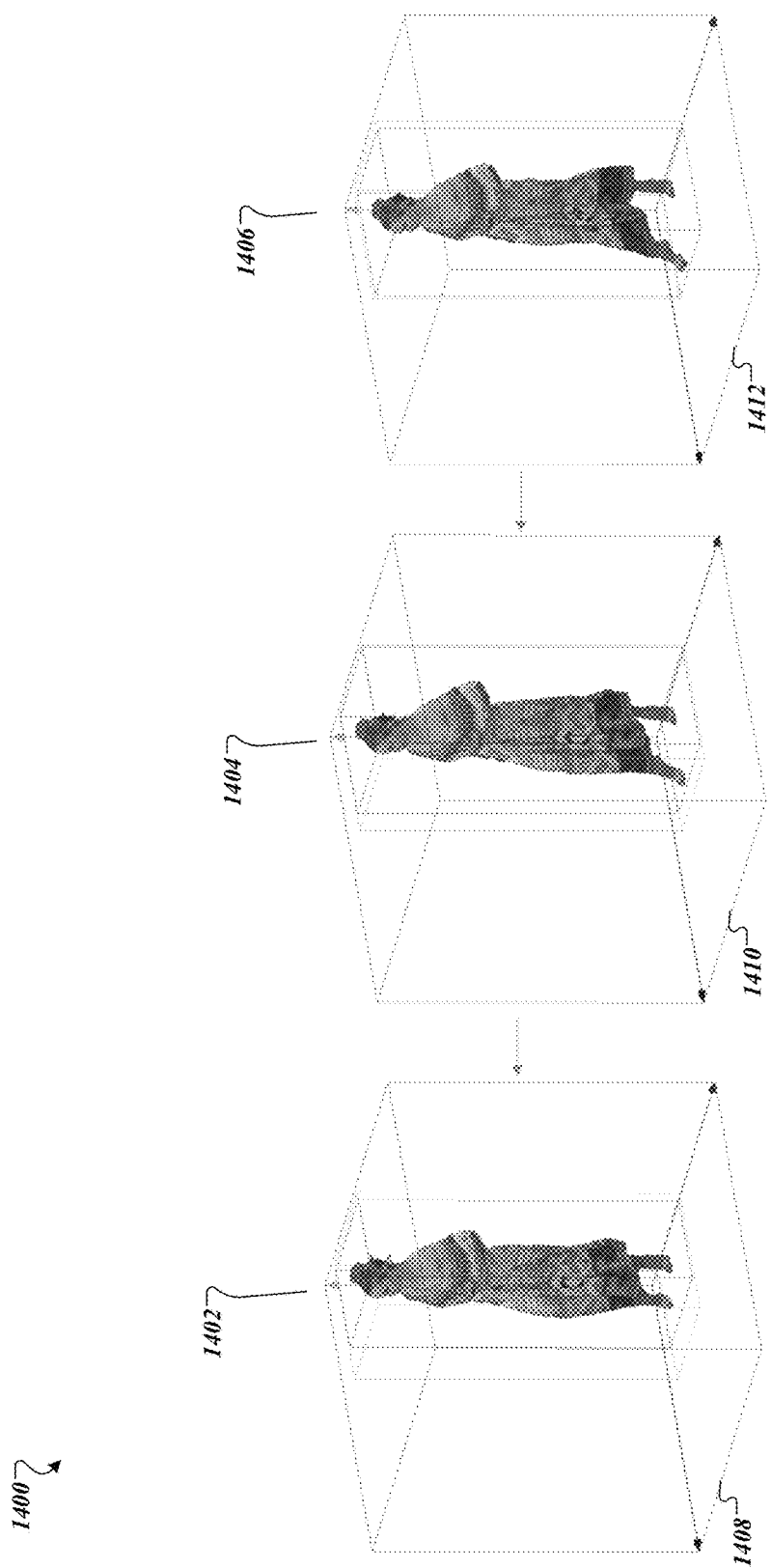
FIG. 14 is an example of a system illustrating a point cloud frame sequence.

FIG. 14 is an example of a system 1400 illustrating a point cloud frame sequence. In particular, the system 1400 illustrates a dynamic point cloud media sequence representing a sequence of frames of point cloud media at different time stamps. For example, the system 1400 includes a first point cloud frame 1402 at a first time stamp, a second point cloud frame 1404 at a second time stamp, and a third point cloud frame 1404 at a third time stamp. The first, second, and third point cloud frames make up a dynamic point cloud sequence that when viewed in real time, illustrate the woman in 1400 moving her right foot forward at the incremental time stamps in a three dimensional environment. The incremental time stamps can be measured in any unit of time, such as seconds or microseconds, to name a few examples.

The system 1400 illustrates a bounding box 1408 for a frame of point cloud media 1402, bounding box 1410 for another frame of point cloud media 1404, and a bounding box 1412 for another frame of point cloud media 1406. The bounding box for each point cloud media includes a fixed-grid in three dimensions, e.g., X dimension, Y dimension, and Z dimension, represented by u1, v1, and d1 locational coordinates.

A bounding box contains points that may be empty or filled with data. In some examples, an empty point can be a void point. In some examples, an occupied point can include one or more attributes. A void point can include a location in a frame of point cloud media that does not have an attribute. On the other hand, an occupied point can include a location in a frame of point cloud media that has at least one attribute. An attribute can include, for example, a chroma, a luna, a reflectance, and a color. The points within the bounding box can be identified by a particular coordinate system. For example, a point within the bounding box 1408 of the frame of point cloud media 1402 can be indicated by the u1, v1, and d1 coordinate system.

Typically, when a client device transmits one or more frames of point cloud media over a network to another client device, each frame of point cloud media is to be encoded. The encoding ensures proper transmission and ensures data is not lost when received at the recipient client device. However, encoding a frame of point cloud media can be complicated because the size of one frame of point cloud media can be over hundreds of gigabytes. For example, a system, such as a client device, seeking to encode the first point cloud frame 1402 would require encoding five hundred gigabytes of data, which would waste time and resources to do so. Thus, a different encoding technique is required that relies on a bounding box, e.g., bounding box 1408, to encode a particular frame of point cloud media. The bounding box representation, as will be described below, allows the system to encode a single frame of point cloud media in a compressed format.

In some implementations, a frame of the point cloud media is encoded using a video-based point cloud compression (V-PCC) coder. The V-PCC coder operates based on segmenting a frame of point cloud media into a set of three-dimensional patches. The three-dimensional patches are presented by the three-dimensional bounding box and manipulated for transmission. This will be further described below.

Figure 15:
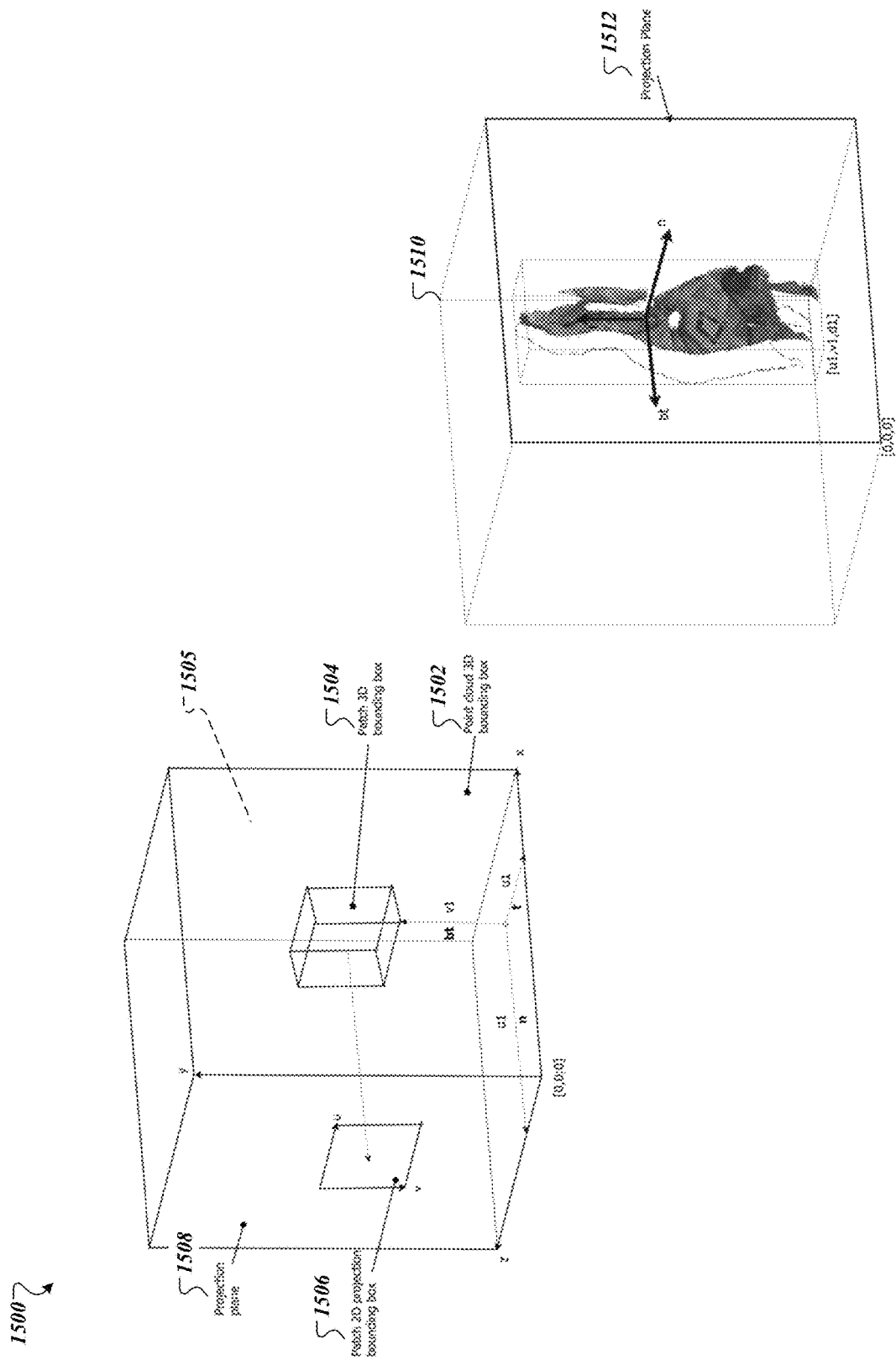
FIG. 15 is an example of a transformation process for a three-dimensional patch bounding box to a two-dimensional patch projection.

FIG. 15 is an example of a transformation process 1500 for a three-dimensional patch-bounding box to a two-dimensional patch projection. In some implementations, the transformation process 1500 is performed by the V-PCC encoder using a V-PCC encoding solution.

During the V-PCC encoding solution, the V-PCC encoder encodes a frame of point cloud media using a three dimensional bounding box. In general, a set of points is iterated and being projected to the bounding box, then patches are segmented based on definition of smoothness continuous surface criteria. Each patch corresponds to a specific and unique index and corresponding 3-D coordinates. Moreover, matched patch list exists to ensure that their order in the list is similar and matched patches in this list have same index.

First, a frame of the 3-D point cloud media is segmented into a set of three-dimensional (3-D) patch bounding boxes or segmentations, such as one or more 3-D patch-bounding boxes 1504. The 3-D patch bounding box 1504 includes the following parameters—u1, v1, d1, size of u1, size of v1, and size of d1. The parameters of the 3-D patch bounding box 1504 indicate the size and placement of the 3-D patch bounding box 1504 within the point cloud 3-D bounding box 1502. In some implementations, the system generates multiple 3-D patch bounding boxes for the entire frame of the point cloud media to cover the object within the frame. Each 3-D patch-bounding box may be placed in proximity to one another. In some implementations, each 3-D patch-bounding box may overlap one another when covering the object within the point cloud 3-D bounding box 1502.

Then, the V-PCC encoder defines a projection plane 1508 as one of the sides of the point cloud 3-D bounding box 1502 for each of the 3-D patch-bounding boxes, such as, 3-D patch bounding box 1504. The V-PCC encoder defines criteria for selecting a projection plane. For example, the criterion includes a definition of smooth continuous surface criteria of each side of the 3-D patch bounding box 1504. A projection plane is chosen when the smooth continuous surface criteria includes an area of the projected 3-D patch bounding box 1504 that is projected onto the side of the 3-D bounding box 1502 and is to be a maximum area among each of the directions for projection. For example, a smooth continuous surface can be determined by the use of one or more smooth continuous algorithms. A smooth continuous surface can be defined as a surface that has a minimum amount of obscured or blocked data points. Then, the V-PCC encoder compares each of the smooth surfaces from each and every direction to determine which direction would generate a 2-D bounding box that would include a maximum area on a side of the 3-D bounding box 1502.

Figure 17:
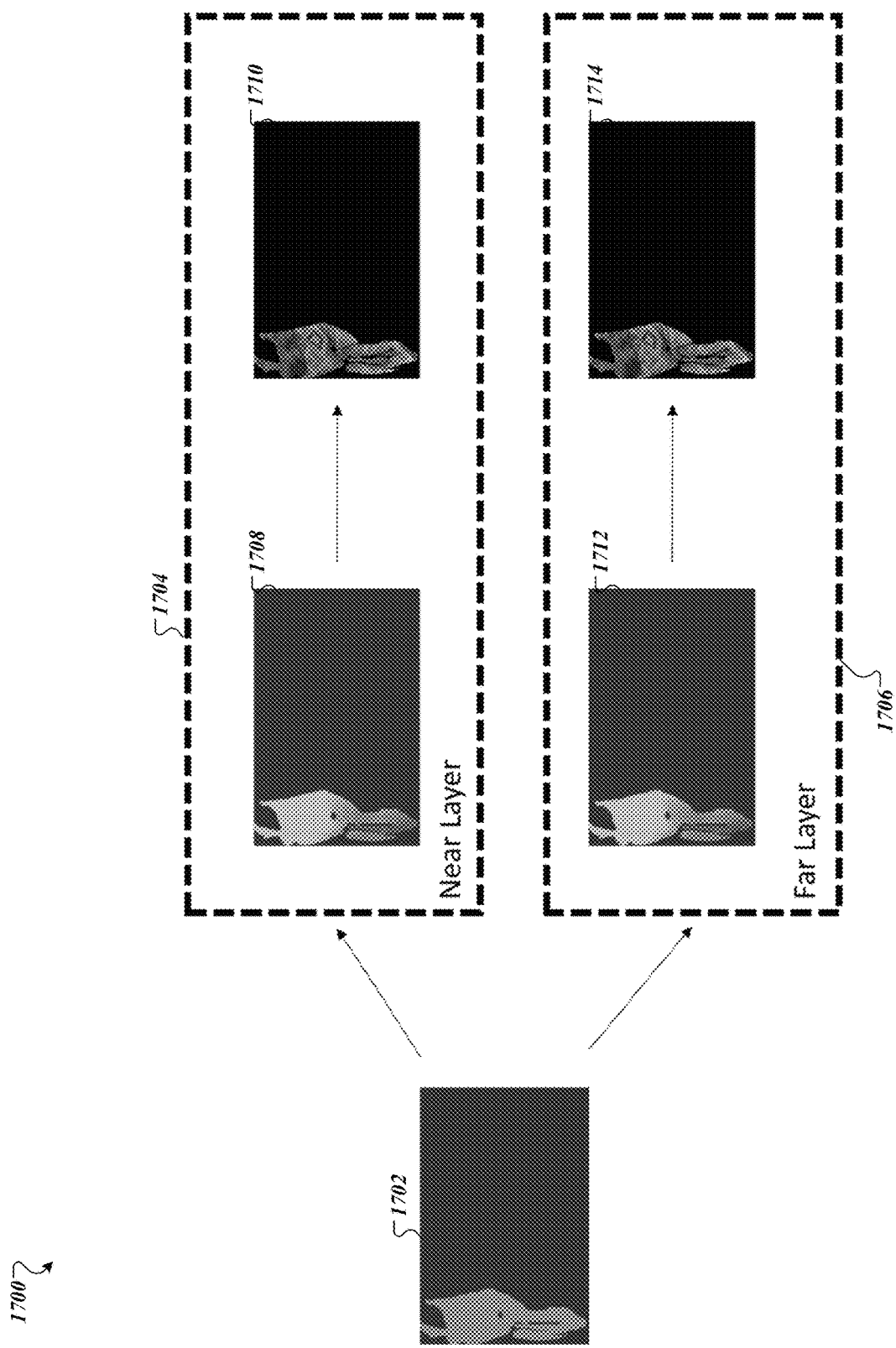
FIG. 17 is an example of attribute segmentation for cloud point media.

As illustrated in system 1500, the projection plane 1508 corresponds to an area of parallel projection of 3-D patch bounding box 1504 to have the maximum area. Said another way, if the V-PCC encoder were to view the 3-D patch bounding box 1504 from the side opposite to the projection plane 1508 (e.g., side 1505), then the V-PCC encoder would determine that when the attribute points included in the patch 3-D bounding box 1504 were projected onto the projection plane 1508, that projection would exhibit a maximum area over projecting onto other sides of the point cloud 3-D bounding box 1502. Because the frame of point cloud media included within the point cloud 3-D bounding box 1502 is still and not moving, the V-PCC encoder can analyze projections from each side of the point cloud 3-D bounding box 1502 to determine which projection would include the maximum area. Thus, the V-PCC encoder determines that the projection plane 1508 would generate the maximum area for the projection of attributes from the patch 3-D bounding box 1504. The projection is therefore displayed within a patch 2-D projection bounding box 1506. The patch 2-D projection bounding box 1506 is defined by u and v coordinates on a near layer and far layer of the bounding box. For, example, FIG. 17 illustrates a near layer 1704 and far layer 1706 of the depth images 1708 and 1712 and the attribute images 1710 and 1714.

Once a projection plane has been selected, e.g., projection plane 1508, a normal axis to the patch 3-D bounding box 1504 is drawn so the V-PCC encoder knows the direction of the projection. For example, the V-PCC encoder draws an axis that is normal or orthogonal the projection plane 1508, denoted by "n" within the point cloud 3-D bounding box 1502. Additionally, the V-PCC encoder generates a tangent and bitangent axes to the patch 3-D bound box 1504, denoted by "bt" and "t" within the point cloud 3-D bounding box 1502. In response to the V-PCC encoder drawing normal, tangent, and bitangent axes within the point cloud 3-D bounding box 1502, a right-hand 3-D coordinate system is generated between the bitangent and the orthogonal axes over the patch 3-D bounding box 1504.

At that point, the V-PCC encoder projects the patch 3-D bounding box 1504 to the projection plane 1508 of the point cloud 3-D bounding box 1502 along the normal axis "n." As shown in process 1500, the result of the projection is two-dimensional (2-D) projection 1506 on the particular side of the point cloud 33-D bounding box 1502.

In some implementations, the 3-D projections of a frame of point cloud media is projected onto each side of the point cloud 3-D bounding box 1502. When a frame is projected onto a side of the point cloud 3-D bounding box 1502, a set of coordinates for the 2-D bounding box can be obtained. The set of coordinates for the 2-D bounding box includes u0, v0, size_u0, and size_v0, for example. As shown in bounding box 1510, the V-PCC encoder projects a surface of the point cloud within the bounding box 1510 onto the projection plane 1512.

Figure 16:
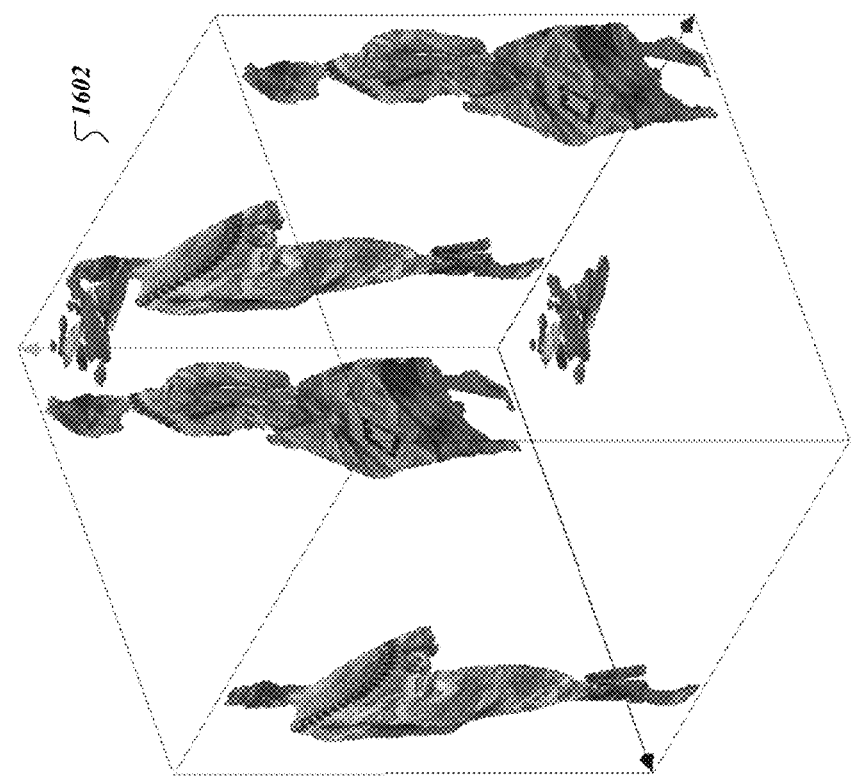
FIG. 16 is an example of a system illustrating 3D to 2D patch projection results.

FIG. 16 is an example of a system 1600 illustrating 3-D to 2-D patch projection results. The system 1600 illustrates a bounding box 1602 with a 2-D patch projection on each side of the bounding box 1602. The projections on each side of the bounding box are based on the orthogonal direction of the patch, as described with respect to system 1500. Each 2-D patch projection includes a patch index, u0, v0, size_u0, and size_v0 that describe 2-D coordinates of the 2-D projection of the patch. The patch index identifies a particular patch associated with a particular side of the corresponding bounding box 1602. U0 defines an X-coordinate of the patch on a projection plane. V0 defines a Y-coordinate of the patch on a projection plane. Size_u0 and size_v0 describe a magnitude corresponding to each coordinate of the patch u0 and v0, respectively.

The patches projected onto bounding box 1602 form a "patch tile group." Each element of the patch tile group corresponds to a particular patch, which includes a specific and unique index and corresponds to a unique 3-D bounding box within the 3-D point cloud frame.

In addition to generating the projection maps on the bounding box 1602, the system stores patch 2-D and 3-D data in memory. For example, code illustrated below provides one exemplary solution for generating patches and storing 2-D and 3-D patch data as supplementary data for video coding:

which corresponds to the top left corner of the X and Y coordinates of the projection. Size_u0 and size_v0 correspond to the height and width of the corresponding patch. For the 3-D patch projection data, the projection map includes u1, v1, and d1 coordinates, which correspond to X, Y, and Z-axes. In particular, the u1, v1, and d1 correspond to the index of the face of the projection, or the face of the projection corresponding to the normal axis. For example, as illustrated in system 1600, each side of the bounding box 1602 includes its own index. Thus, each index represents a particular projection axis. In this regard, u1, v1, and d1 are the reconstructions of X, Y, and Z coordinates shown in the bounding box 1602.

In some implementations, the u1, v1, and d1 coordinates correspond to a local coordinate system. The X, Y, and Z coordinates correspond to a global coordinate system. For

---

Algorithm. PCC coder additional data export

---

1. while frame k in GoF frames do
       generate patches in frame k.
       for each patch in frame k
           generate projection map from patches
               store patch2D data: U0, sizeU0, V0, sizeV0
               store patch3D data: U1, V1, D1, axis
           end for
       end while

---

```
For k-th frame:
  double patch3DCoor[MAX_NUM_PATCHES][4];
  size_t patch2DCoor[MAX_NUM_PATCHES][4];
  patch2DCoor[patchIndex][0] = patch.getU0( ) * patch.getOccupancyResolution( );
  patch2DCoor[patchIndex][1] = (patch.getU0( ) + patch.getSizeU0( )) *
patch.getOccupancyResolution( );
  patch2DCoor[patchIndex][2] = patch.getV0( ) * patch.getOccupancyResolution( );
  patch2DCoor[patchIndex][3] = (patch.getV0( ) + patch.getSizeV0( )) *
patch, getOccupancyResolution( );
  PCCVector3D pointStart, pointEnd;
  const double lodScale = params.ignoreLod_ ? 1.0 : double(1u << patch.getLod( ));
  int x = patch.getU0( ) * patch.getOccupancyResolution( ), y = patch.getV0( )*
patch.getOccupancyResolution( );
  pointStart[patch.getNormalAxis( )] = double(frame0.getValue(0, x, y) + patch.getD1( ))
* lodScale;
  pointStart[patch.getTangentAxis( )] = patch.getU1( ) * lodScale;
  pointStart[patch.getBitangentAxis( )] = patch.getV1( ) * lodScale;
  x = (patch.getU0( ) + patch.getSizeU0( )) * patch.getOccupancyResolution( ) - 1;
  y = (patch.getV0( ) + patch.getSizeV0( )) * patch.getOccupancyResolution( ) -1;
  pointEnd[patch.getNomialAxis( )] = double(frame0.getValue(0, x, y) + patch.getD1( ))
* lodScale;
  pointEnd[patch.getTangentAxis( )] = (patch.getSizeU0( ) *
patch.getOccupancyResolution( ) - 1 + patch.getU1( )) * lodScale;
  pointEnd[patch.getBitangentAxis( )] =(patch.getSizeV0( ) *
patch.getOccupancyResolution( ) - 1 + patch.getV1( )) * lodScale;
  patch3DCoor[patchIndex][0] = pointStart[patch.getTangentAxis( )];
  patch3DCoor[patchIndex][1] = pointStart[patch.getBitangentAxis( )];
  patch3DCoor[patchIndex][2] = pointEnd[patch.getTangentAxis( )];
  patch3DCoor[patchIndex][3] = pointEnd[patch.getBitangentAxis( )];
```

Supplemental Information Generation for Video Coding

The code described above illustrates the definition of "patch"; how the patch 3-D information is transferred to 2-D patch information: the projection process; and, the reconstruction process. In particular, how these frames are interpreted in terms of their 2-D projections.

Additionally, for each patch in a frame, the V-PCC encoder generates a projection map. The projection map includes the additional text file that is provided to the video encoder. The 2-D data for a particular patch, e.g., u0, v0, example, when the normal axis is determined (corresponding to the axis of projection), the V-PCC encoder can rotate the axis of projection to align with the Z axis, within the 3-D space. At this point, the V-PCC encoder can translate between the local coordinate system and the global coordinate system.

The proposed solution also provides additional motion vector candidates for motion compensation based on auxiliary information that is used as an additional input to a video compression solution in video compression techniques.

| Algorithm. Enhanced motion estimation for 3d data |
|---|
| 1. PCC encoder generates additional reference frame from auxiliary informtaion by providing patch index list and corresponding 3d coordinates |
| 2. Additional motion vector candidates are generated in mv candidate list for 2d domain in video compression solution by analyzing the existing frame and correspendinf data from auxiliar file<br>while patch i in framek, k=1,2,..,GOP-1, do<br>    white patch j of Patches in reference frame, do<br>    if(occcupancy m ap)<br>        add patch 3d coordinates to prediction list<br>        do 3D motion search for patches in 3d coordinates list<br>    end while<br>end while |
| 3. Refine pcMvFieldNeighbours candidate list for each frame in GOP frames. |
| 4. Refine mergeCandidateList for each frame in GOP frames. |
| 5. Video bsed compression engine |

FIG. 17 is an example of a system 1700 for attribute segmentation for cloud point media. Once the 2-D patches for each 3-D point cloud are generated from the projections, a set of images are generated for each of the 2-D patches within a patch tile group. The system 1700 generates the set of images for each patch of the 2-D patches within the patch tile group because depth and attribute information is lost during the 3-D to 2-D projection. The set of images are generated to preserve the depth and attribute information corresponding to the point-cloud media before the projection occurred.

In some implementations, a patch tile group includes a patch 1702. The system generates two sets of images from the particular patch 1702. The first set of images includes a near layer 1704. The second set of images includes a far layer 1712. The near layer 1704 includes an image 1708 of depth data and an image 1710 of attribute data. Additionally, the far layer 1706 includes an image 1712 of depth data and an image 1712 of attribute data. Thus, each and every point in the 2-D projection has depth information and attribute information, e.g., a color, texture, luna, etc. The particular layers, e.g., near layer 1704 and far layer 1706, illustrate both sides of the 2-D projection of the 3-D point cloud object.

Figure 18:
FIG. 18 is an example of a system illustrating packing patches for point cloud media having attribute information.

FIG. 18 is an example of a system 1800 illustrating packing patches for point cloud media having attribute information. In some implementations, the attribute information can include texture information, depth information, color information, luna, reflectance, and chroma information. The packaged patch group 1802 illustrates one or more projected patches. 2-D frames, from a frame of point cloud media, such as the frame of point cloud media 1402. The collection of patches creates a patch tile group, and the patch tile groups are combined in a patch data group for a given frame of point cloud media. Each element of the patch data group, referred to as a "patch," includes a specific and unique index and corresponds to a unique 3-D bounding box within the 3-D point cloud frame. The packaged patch 1802 can be encoded and subsequently, transmitted. In particular, if the patch in one point cloud frame has a corresponding reference patch in a reference point cloud frame, e.g., a previous frame, an index of the reference patch in the reference patch tile group is transferred in a bit stream. This will be further described below.

Figure 19:
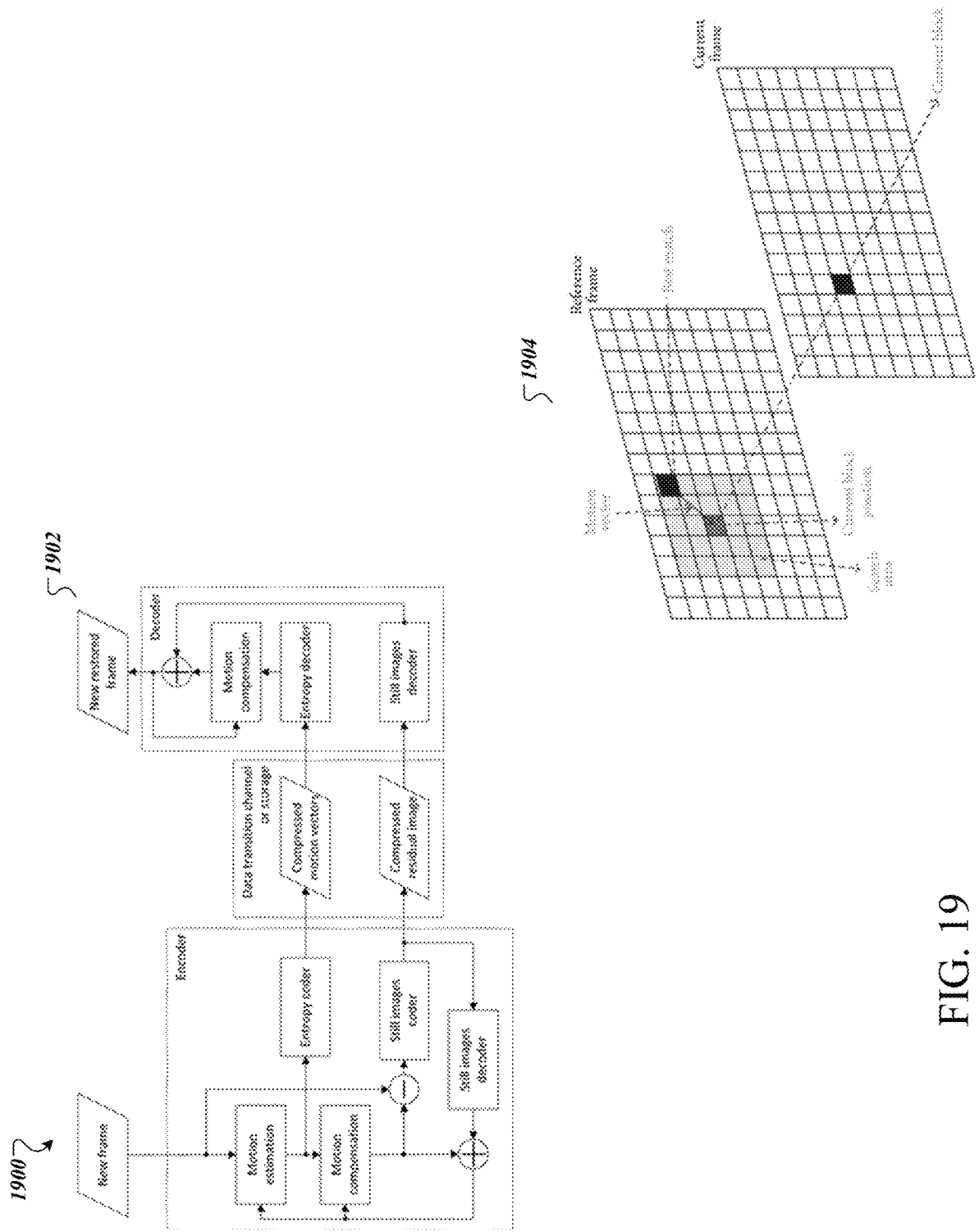
FIG. 19 is an example of a system for performing motion estimation.

FIG. 19 is an example of a system 1900 for performing motion estimation. In prior video compression solutions, data from a 2-D projected image, e.g., a patch, is estimated using a motion estimation process. The system 1900 illustrates this motion estimation process. The encoding and decoding blocks shown in block 1902 generate motion estimation using an encoder, transmitting the motion estimation over a data transition channel or storage, and decoding the transmitted motion estimation at a decoder. The result is a newly restored frame.

Block 1904 depicts the illustration of the motion estimation process. For example, an encoder generates a predictor of similar patch images in a reference frame. A reference frame can be a previous frame, for example. In some implementations, the encoder determines similarity by comparing the values of the samples between a reference frame and a current frame. The values of the samples can differ by attributes and location, for example. This process is called motion estimation with a goal of finding the corresponding image in a reference frame that looks similar to an image in a current frame. The encoder searches for pixels within neighboring pixels of the reference frame. When the matching image is found, the encoder encodes the similarity that requires a less amount of information, without specifically encoding each image from the current and the reference frame. Overall, this reduces bandwidth for transmission. Thus, the encoder analyzes the current and previous frame for similar images. Determines refinement data associated with the attribute and location information for each of the images between the current and reference (previous) frame. Then, the encoder encodes the refinement data for the current frame and a future predicted frame. This is typically used for transmitting 2-D motion video or 2-D images.

Due to the specifics of a patch packing method, the locations of the patches within a projection frame for each point cloud media may significantly differ. Thus, in between different frames, a patch can jump between one position to another position, such as across different sides of a 3-D bounding box. As such, prediction motion estimation using the location of patching in inter prediction coding algorithms as typically used for 2-D motion video or 2-D images cannot be satisfied and thus, not properly encoded and transmitted. Therefore, the blocks 1902 and 1904 although useful, require enhancements for transmitting motion estimation data using patch data groups. Therefore, the techniques described below enhance the use of prediction using motion estimation for 2-D patch data by adding auxiliary information to a motion vector candidates list.

In the case of temporal prediction between 2-D patches to be transmitted, valid motion vector candidates are supplied for similar patches to ensure maximum compression efficiency during transmission. Existing motion vector candidates list constructions methods may be improved by replacing existing candidates, or introducing additional candidates generated from patch auxiliary information, as further described below.

In some implementations, a certain patch in a frame has particular 2-D coordinates that is connected by patch metadata to 3-D coordinates within the point-cloud media. The patch data (also referred to as "auxiliary information") is based on corresponding 3-D locations of the patches and an associated projection location on the 2-D plane. In some implementations, auxiliary information or patch metadata can include a patch index, u0, v0, u1, v1, and d1. The u0 and v0 correspond to the top left corner of the patch in the 2-D projection. The u1, v1, and d1 represent the X, Y, and Z coordinates in the 3-D domain. Thus, the u0 and v0 coordinates are connected to the u1, v1, and d1 coordinates. The connection is based on a mathematical relationship between the u1, v1, and d1 coordinates and the u0 and v0 coordinates. This connection between the 2-D and 3-D coordinates can be used to generate motion vector candidates, update vector candidate list, and update the motion vector search process.

Figure 20:
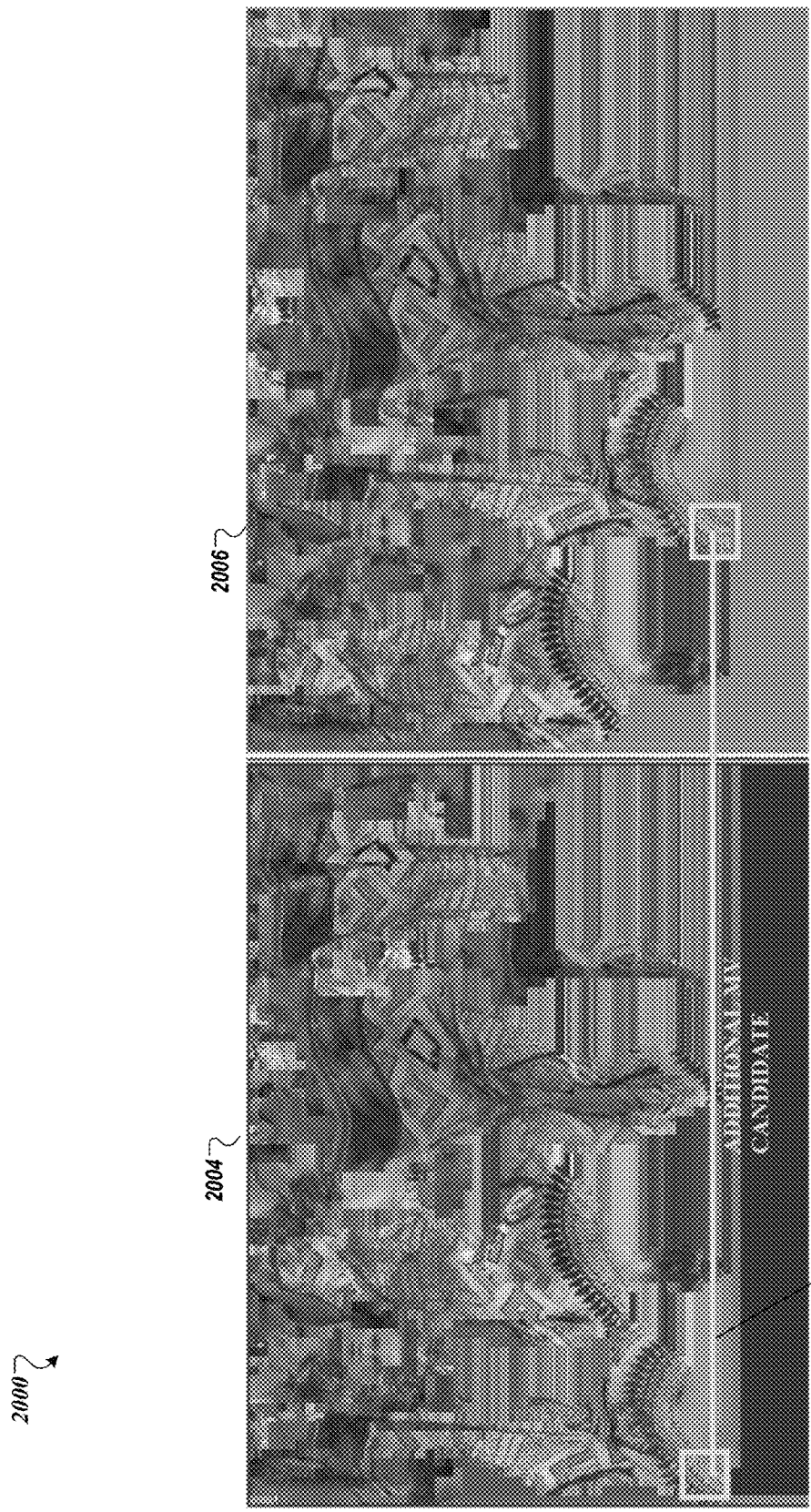
FIG. 20 is an example of a system illustrating of a motion vector candidate between a patch of a current frame and a patch of a reference frame.

FIG. 20 is an example of a system illustrating of a motion vector candidate between a patch of a current frame and a patch of a reference frame. An encoder of a client device, e.g., V-PCC encoder, analyzes a current patch frame to a previously encoded reference frame. The encoder must first decode the previously encoded reference frame in order to compare it to the current frame. Then, the encoder gives the current patch frame into one or more small blocks called prediction units (PUs). An amount of information stored in each PU is significant, and thus, in order to reduce the amount of information when transmitting, the encoder relies on a differential coding method. The encoder generates a residual frame. For example, a predictor unit PU (belonging to the patch of the reference frame) is subtracted from the current PU (belonging to the current frame), e.g., current PU-predictor unit PU to generate a residual frame. The encoder subsequently only encodes a residual frame to be used for transmission. For example, the following code describes this process:

1. Split current frame into N PU blocks
2. Generate PU_pred candidate list from the current auxiliary frame
3.

```
for i = 0 to N-1
  get the (x,y) coordinates for top left corner of the PU_cur[i]
  perform search for predictor PU_pred in the reference image
  cost[k] = max
  while cost[k] > minCost[k-1] do
    cost[k] = (PU_cur[i] – PU_pred[k]) + lambda * BitSize
  encode in bitstream:
    MV = PU_cur[i](x,y) – PU_pred[k](x,y)
    ResidualUnit = Transform(PU_cur[i]-PU_pred[k])
```

The code above describes the process for coding mode selection based on a rate-distortion problem minimization. In some implementations, the encoder searches for a predictor unit PU in the previously encoded reference frame and performs a search for matching to values to the current PU, with respect to the amount of bits that are required to encode the residual. The process of selecting a predictor unit PU includes a rate-distortion minimization problem, where the rate corresponds to a bit size of the coded residual, and the distortion corresponds to an L2 norm of the residual, which corresponds to the distance of the residual from the origin. Then, the encoder encodes the residual information and the corresponding displacement information, which becomes the motion vector. However, this implementation requires enhancements when encoding and transmitting point cloud media.

The encoder is enhanced by reviewing the additional auxiliary information included from the patch data. For a current frame, the auxiliary information is generated from a current 2-D patch and corresponding 3-D point cloud. For the reference frame, the auxiliary information is generated from the previously encoded reference 2-D patch and corresponding 3-D point cloud. The encoder can predict a block location from comparing the auxiliary information from the patch of a current frame, e.g., u0, v0, u1, v1, and d1, to the auxiliary information from the patch of a reference frame, e.g., u0, v0, u1, v1, and d1. The comparison results in a distance between the patches based on their auxiliary information.

In some implementations, the encoder first determines a 3-D difference. The 3-D difference corresponds to the 3-D difference between the current auxiliary information frame and the reference auxiliary information frame since the 3-D position of the start pixel of the CU can be different. The equations include the following:

$$MV_{X_{3D}} = \text{patch3}d\_\text{shift}\_u_{cur} - \text{patch3}d\_\text{shift}\_u_{ref}$$

$$MV_{Y_{3D}} = \text{patch3}d\_\text{shift}\_v_{cur} - \text{patch3}d\_\text{shift}\_v_{ref}$$

Then, the encode calculates a 2-D difference. The 2-D difference corresponds to the 2-D difference between the current auxiliary information frame and the reference auxiliary information frame, considering the occupancy block resolution (OBR). The OBR corresponds to the scale of coordinates in the patch data group verses the patch projection size. For example, the patch width equals patch projection size multiplied by the OBR. The encoder then generates a motion vector in the 2-D domain. The equations include the following:

$$MV_{X_{2D}} = (\text{patch2}d\_\text{shift}\_u_{ref} - \text{patch2}d\_\text{shift}\_u_{cur}) \times obr$$

$$MV_{Y_{2D}} = (\text{patch2}d\_\text{shift}\_v_{ref} - \text{patch2}d\_\text{shift}\_v_{cur}) \times obr$$

The final derived motion vector is the combination of these two motion vector components. For example, the final derived motion vector corresponds to:

$$MV_X = MV_{X_{3D}} + MV_{X_{2D}}$$

$$MV_Y = MV_{Y_{3D}} + MV_{Y_{2D}}$$

In the non-normative solution, a motion vector (MV) is estimated as a candidate of the center of the search range. After adding the derived estimated MV as the candidate, the encoder will choose from the predicated MV, the zero MV, the estimated MV, and the MV from the partition 2N×2N using RDO to determine the center of the search range. If the estimated MV has the minimal rate-distortion (R-D) cost, it will be used for video compression.

Figure 21:
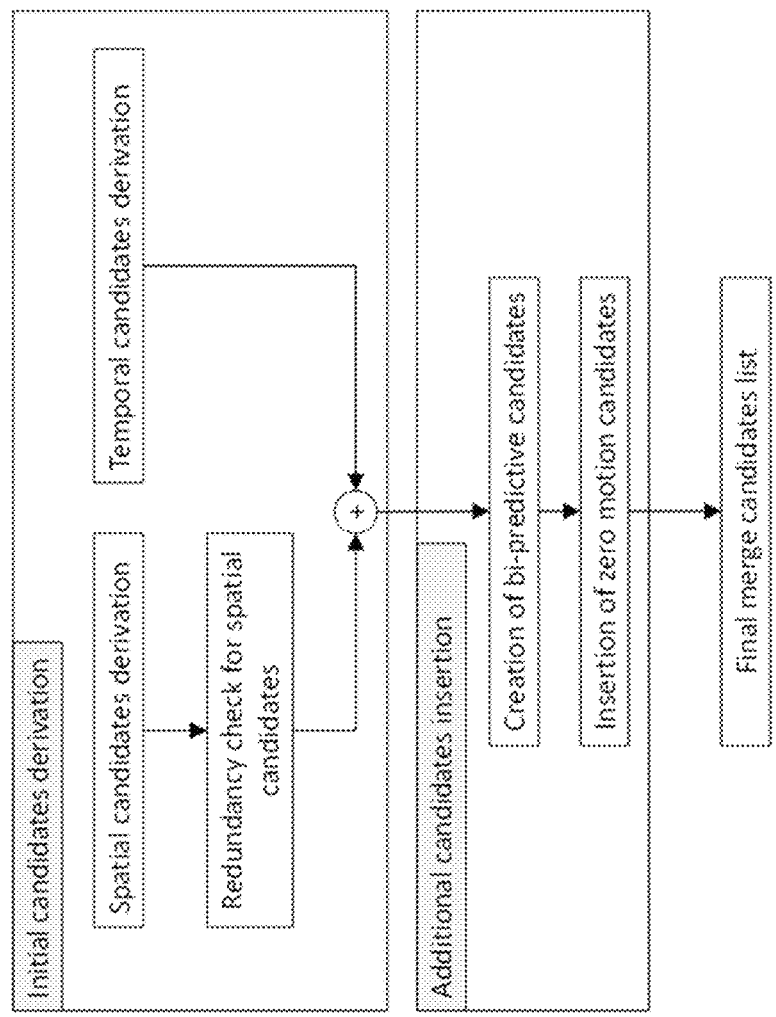
FIG. 21 illustrates a derivation process for merge candidates list construction.

FIG. 21 illustrates a derivation process 2100 for merge candidates list construction. In some implementations, when a prediction unit is predicted using merge mode, an index pointing to an entry in the merge candidates list is parsed from the bitstream and used to retrieve the motion information. The construction of this list is specified in the HEVC standard and can be summarized according to the following sequence of steps:

Step 1 Initial candidates derivation
Step 1.1: Spatial candidates derivation
Step 1.2: Redundancy check for spatial candidates
Step 1.3: Temporal candidates derivation
Step 2: Additional candidates insertion
Step 2.1: Creation of bi-predictive candidates
Step 2.2: Insertion of zero motion candidates These steps are also schematically depicted in FIG. 21. For spatial merge candidate derivation, a maximum of four merge candidates are selected among candidates that are located in five different positions. For temporal merge candidate derivation, a maximum of one merge candidate is selected among two candidates. Since constant number of candidates for each Prediction Unit is assumed at decoder, additional candidates are generated when the number of candidates does not reach to maximum number of merge candidate (MaxNumMergeCand) which is signaled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

Figure 22:
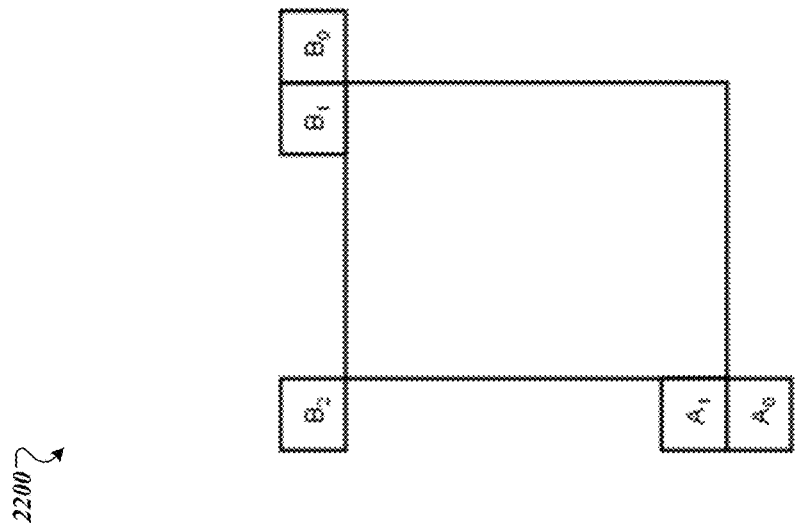
FIG. 22 illustrates a system of positions of spatial merge candidates and candidate pairs considered for redundancy check of spatial merge candidates.
Figure 22:
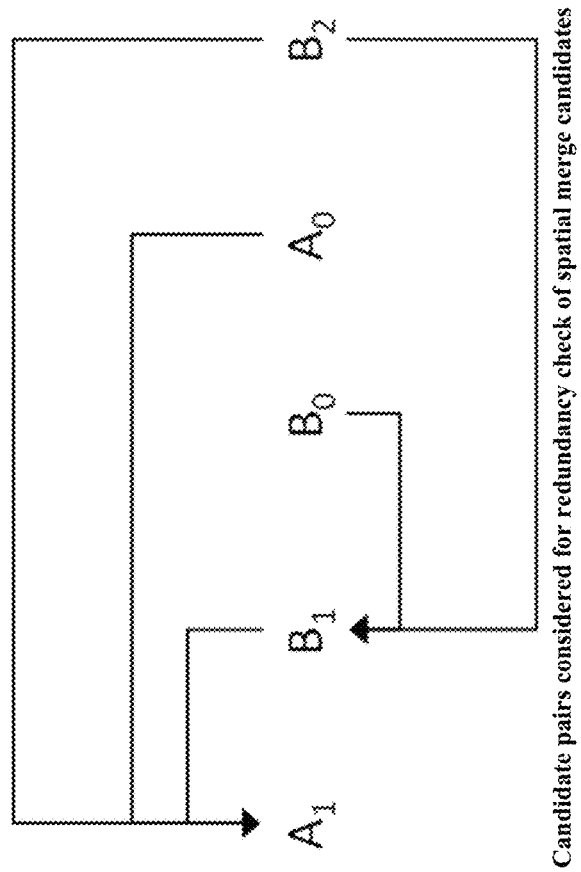

FIG. 22 illustrates a system 2200 of positions of spatial merge candidates and candidate pairs considered for redundancy check of spatial merge candidates. In the derivation of spatial merge candidates, a maximum of four merge candidates are selected among candidates located in the positions depicted in FIG. 22. The order of derivation is $A_1$, $B_1$, $B_0$, $A_0$, and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check, which ensures that candidates with same motion information are excluded from the list so that coding efficiency is improved. To reduce computational complexity, not all possible candidate pairs are considered in the mentioned redundancy check. Instead, only the pairs linked with an arrow in FIG. 22 are considered and a candidate is only added to the list if the corresponding candidate used for redundancy check has not the same motion information. Another source of duplicate motion information is the "second PU" associated with partitions different from 2N×2N. As an example, FIG. 22 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

Figure 23:
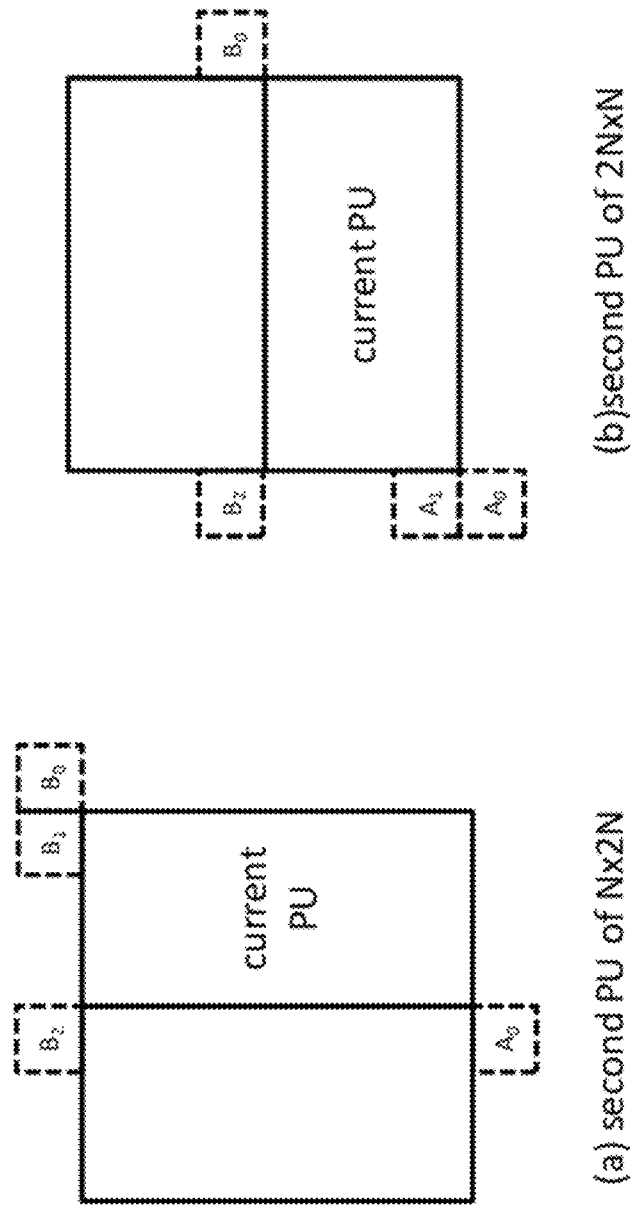
FIG. 23 illustrates a system showing positions for the second PU of N×2N and 2N×N partitions.
Figure 24:
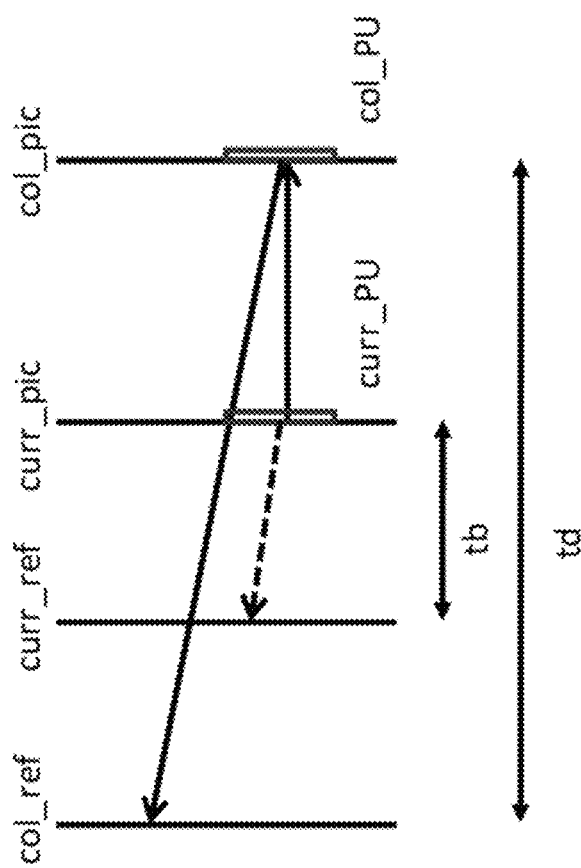
FIG. 24 illustrates obtaining a scaled motion vector for temporal merge candidate.

FIG. 23 illustrates a system 2300 showing positions for the second PU of N×2N and 2N×N partitions. In particular, the system 2300 describes a temporal candidates derivation process. In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header. The scaled motion vector for temporal merge candidate is obtained as illustrated by the dotted line in FIG. 24 (system 2400), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 25:
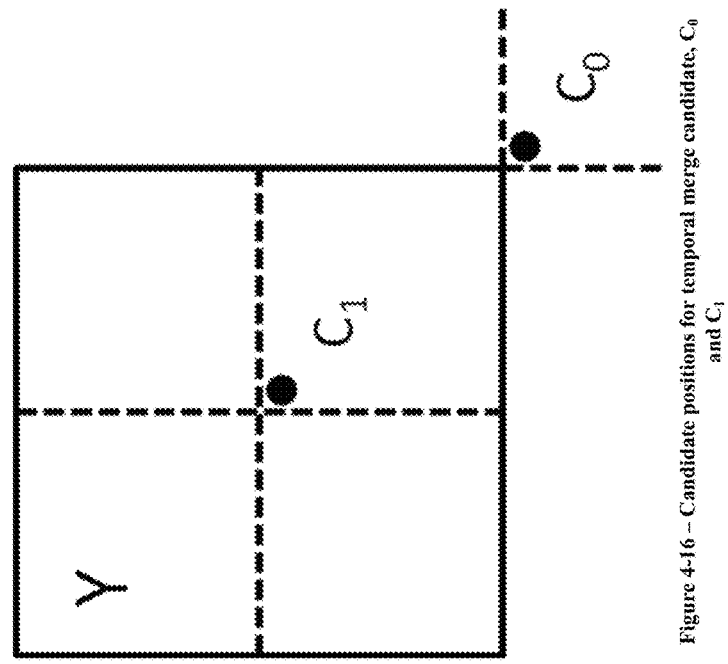
FIG. 25 is a system illustrating candidate positions for temporal merge candidates

FIG. 25 is a system 2500 illustrating candidate positions for temporal merge candidates. In the co-located PU (Y) belonging to the reference frame, the position for the temporal candidate is selected between candidates $C_0$ and $C_1$, as depicted in system 2500. If PU at position $C_0$ is not available, is intra coded, or is outside of the current CTU, position $C_1$ is used. Otherwise, position $C_0$ is used in the derivation of the temporal merge candidate.

Figure 26:
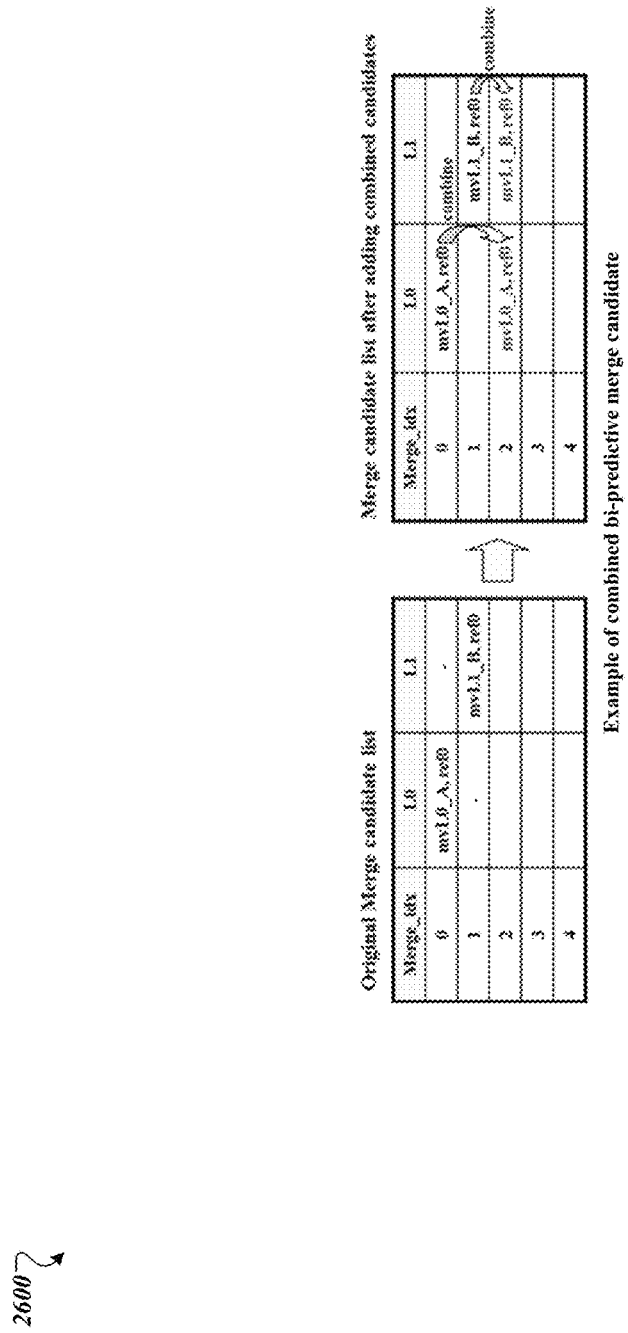
FIG. 26 illustrates an example table of combined bi-predictive merge candidates.

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, system 2500 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates, FIG. 26 illustrates an example table 2600 of combined bi-predictive merge candidates. Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni-directional and bi-directional prediction, respectively. Finally, no redundancy check is performed on these candidates.

Figure 27:
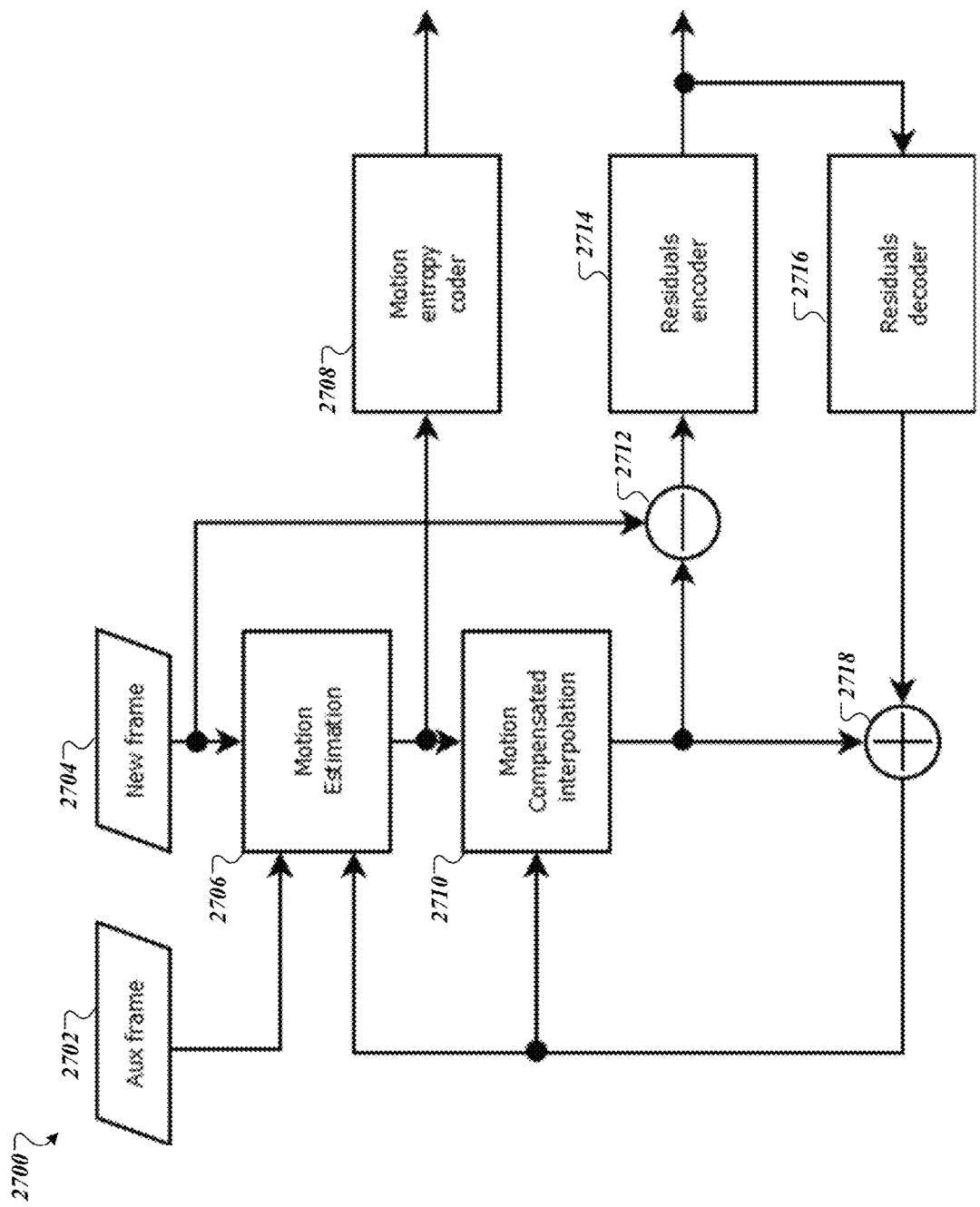
FIG. 27 is an example of a system including a modification of a motion estimation pipeline using auxiliary data

FIG. 27 is an example of a system 2700 including a modification of a motion estimation pipeline using auxiliary data. The system 2700 illustrates additional components to the encoder portion of the motion estimation pipeline illustrated in component 1902 in system 1900. For example, the system 2000 includes an auxiliary frame 2002 (also referred to as a patch frame data unit or a patch frame data group). The system 2700 also includes a new frame 2704, motion estimation component 2706, motion entropy coder 2708, motion compensated interpolation 2710, a subtraction module 2712, residuals encoder 2014, residuals decoder 2016, and an adder 2018.

The motion estimation component 2706 receives the auxiliary frame 2702, the new frame 2704, and a previously encoded (now decoded) residual frame from the residuals decoder 2716 and the adder 2718.

In some implementations, when the motion estimation component 2706 receives the new frame 2704, which includes the patch data for a frame, the motion estimation component 2706 compares the 3-D coordinates associated with the patch within the aux frame 2702. This is because each aux frame 2702 includes its own patch metadata (or auxiliary data) that will explains a transfer between 2-D coordinates of the patch data to 3-D coordinates of the point cloud media within a bounding box. In particular, the motion estimation 2706 generates the reference frame using the patch metadata in the aux frame 2702. Then, the current 3-D information from the current frame, e.g., new frame 2704, and the 3-D information from the previous frame, e.g., reference frame, can be used to determine a location of the patch. For example, the motion estimation 2706 can determine that this patch in the new frame 2704 comes from the same location in 3-D coordinates as another patch in the reference frame, where the patch in the reference frame is located at a different 2-D location in the new frame 2704.

Then, the motion estimation component 2706 executes this process for each patch in the new frame 2704 and retrieves the 2-D information to obtain the corresponding 3-D information. The motion estimation component 2706 obtains the 2-D information for the patch in the aux frame 2702. Using the 2-D information of the patch in the new frame 2704 and the 2-D information of the patch in the aux frame 2702, the motion estimation component 2706 determines the 2-D distance between these two patches, e.g., by comparing the u0 and v0 location coordinates of patch from new frame 2704 to the u0 and v0 location coordinates of patch in the aux frame 2702, and subsequently, can determine how the patch has moved in 2-D from its location in the aux frame 2702 to its location in the new frame 2704.

This difference between the u0, v0 of patch in aux frame 2702 and the u0, v0 of patch in the new frame 2704 corresponds to a motion vector candidate. The motion estimation component 2706 inserts this generated motion vector candidate in a motion vector candidate list. The motion estimation component 2706 performs this process of comparing each patch in the new frame 2704 to each patch in the aux frame 2702. If a match occurs, than the difference between the 2-D coordinates between these matched patches is added to a motion vector candidate list.

In some implementations, once the motion vector candidate has been added to the motion vector candidate list, 3-D motion search is performed for patches in the 3-D coordinate list.

In some implementations, the encoder includes a field neighbor's candidate list. The field neighbor's candidate list can include possible locations for reviewing the motion within the 2-D image. The motion estimation component 2706 can refine the locations in the field neighbor's candidate list for each patch frame.

The process for fining matched patches in reference frames using auxiliary information is shown in the illustrated code below. For example, using existing patches 2-D and 3-D information from an auxiliary 3-D information file generated from point cloud compression solution buffer for reference frames. For example, the code includes:

---
Algorithm. Find matched patches in reference frames

```
while frame k in GoP frames do
    for each patch in patches list of reference frame [refIdx]
        for each patch in patches list of frame [k]
            estimate cost in RDO based on prediction
            if (patchIdx[k] = patchIdx[refIdx])
                do motion refinement
            end if
            if (dist < bestDist)
                update pcMvFieldNeighbours
            end if
        end for
    end for
end while
```
---

```
For k-th frame:
    for (Int yCoorRef = 0; yCoorRef < picHeight; yCoorRef++) {
        for (Int xCoorRef = 0; xCoorRef < picWidth; xCoorRef++) {
            Double* refDepthX = m_pcPic->getDepthX(Int(eRefPicList) * MAX_NUM_REF + refIdx);
            Double* refDepthY = m_pcPic->getDepthY(Int(eRefPicList) * MAX_NUM_REF + refIdx);
            Double* refDepthZ = m _pcPic->getDepthZ(Int(eRefPicList) * MAX_NUM_REF + refIdx);
            Double xCoorRef3D = refDepthX[yCoorRef * picWidth + xCoorRef];
            Double yCoorRef3D = refDepthY[yCoorRef * picWidth + xCoorRef];
            Double zCoorRef3D = refDepthZ[yCoorRef * picWidth + xCoorRef];
            Double dist = (xCoor3D - xCoorRef3D) * (xCoor3D - xCoorRe3D) + (yCoor3D - yCoorRef3D) *
                (yCoor3D - yCoorRef3D) + (zCoor3D - zCoorRef3D) * (zCoorD - zCoorRef3D);
            if (dist < bestDist) {
                bestDist = dist;
                bestXCootRef = xCoorRef;
                bestYCoorRef = yCoorRef;
            }
        }
    }
    TComMv depthMVP((bestXCoorRef - xCoor) << 2, (bestYCoorRef - yCoor) << 2);
    pcMvFieldNeighbours[(iCount << 1) + 1].setMvField(depthMVP, refIdx);
```
---

In the code above, the V-PCC encoder seeks matched patches in reference frames for the video encoder. The V-PCC encoder uses the same 2-D and 3-D information corresponding to the patches in each of the frames and the projection information described with respect to FIG. 16. In this step, the V-PCC encoder generates new candidates for the motion refinement. The algorithm executes in the following manner: the V-PCC encoder loops through each frame in a group of frames. The V-PCC encoder retrieves a patch from a patch list from a particular reference frame. Afterwards, the V-PCC encoder retrieves a particular patch from a current frame.

The V-PCC encoder estimates cost in rate distortion optimization based on a motion vector candidate. The cost or distance, e.g., a metric distance in metric or vector space, that is returned by the estimate cost in rate distortion optimization function corresponds to a minimum amount of cost from the motion vector candidate list. In particular, the minimum amount of cost corresponds to the summation of the squared values of the X differences, the Y differences, and the Z differences. For example, the X coordinate of the patch in the reference frame is subtracted from the X coordinate of the patch in the current frame to generate a X difference ("Xdif"); the Y coordinate of the patch in the reference frame is subtracted from the Y coordinate of the patch in the current frame to generate a Y difference ("Ydif"); and, the Z coordinate of the patch in the reference frame is subtracted from the Z coordinate of the patch in the current frame to generate a Z difference ("Zdif"). Then, the PCC encoder sums the squares of Xdif, Ydif, and Zdif to generate a particular distance between the patch in the reference frame and the patch in the current frame.

This process of estimating cost in rate distortion optimization is iterated until a minimum cost or distance is found. When the minimum cost or distance is found, then the pcMvFieldNeighbors variable is updated with the X coordinate, Y coordinate, and minimized cost value that corresponds to the correct patch associated with the patch from the reference frame.

Then, the V-PCC encoder performs motion compensations based on refined motion vector candidates and merge candidates. In some implementations, a new entity is generated from the list of merge candidates. This entity is used as a predictor to perform the motion estimation to find a better prediction for the motion estimation. For example, the motion vector candidate list is updated based on the 3-D information for the patches and corresponding 2-D patch location in the projected image. Additionally, the merge candidate list can be updated based on 3-D information for patches and corresponding 2-D location in the projected image. Thus, this information is added to the video compression and decompression. This information is created for the video encoder based on the auxiliary information and the same information is created for the video decoder. The motion vector candidate list is not transferred or calculated, but rather, generated by the V-PCC encoder upon receiving the 2-D patches with the patch metadata. The motion vector candidate list is generated according to the "Supplemental Information Generation for Video Coding" code set. Both V-PCC encoder and V-PCC decoder perform the "Supplemental Information Generation for Video Coding" to generate the motion vector candidate list. Thus, no additional motion vector candidate list or other information is required to be transferred between the V-PCC encoder and the V-PCC decoder.

In some implementations, the auxiliary information file is generated from the point cloud coded bitstream. The point cloud coded bitstream will be further described and illustrated below. The auxiliary information is used to generate new motion vector candidates on the both the V-PCC encoder and the V-PCC decoder, which both use the same method to ensure the V-PCC encoder and V-PCC decoder generate the same results. By using the auxiliary information, the V-PCC encoder and V-PCC decoder have generated a new motion vector candidate and merge candidate list inputs. Then, the new motion vector candidate and the merge candidate list are provided to existing video encoding/decoding techniques.

Figure 28:
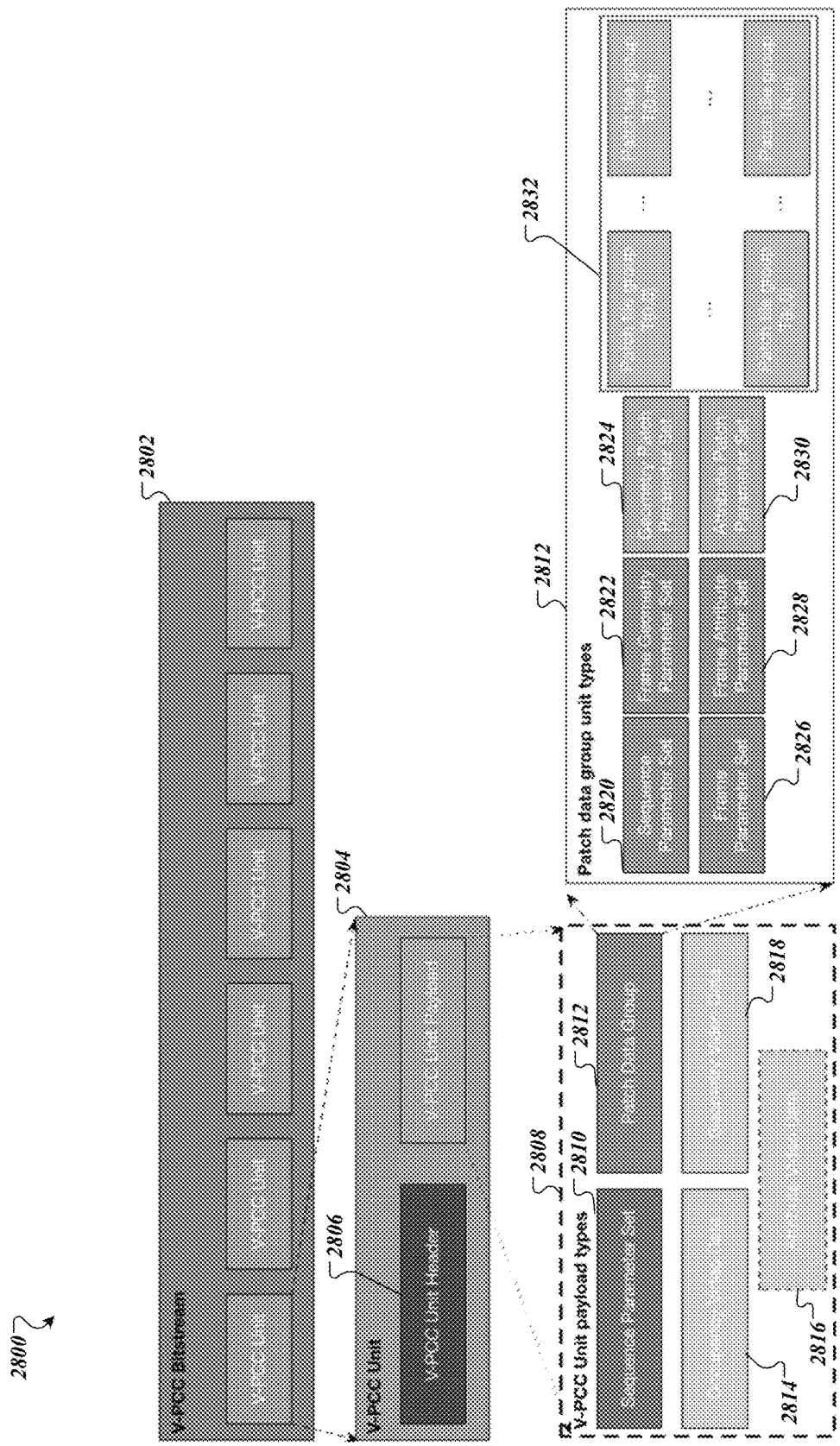
FIG. 28 is an example of a packet stream representation of a V-PCC unit payload.

FIG. 28 is an example of a packet stream 2800 representation of a V-PCC unit payload. The packet stream 2800 includes a V-PCC bitstream 2802. The V-PCC bitstream 2802 includes one or more V-PCC units. For example, a V-PCC unit 2804 includes a V-PCC Unit Header 2806 and a V-PCC Unit Payload 2808. The V-PCC Unit Payload 2808 includes a sequence parameter set 2810, a patch data group 2812, occupancy video data 2814, geometry video data 2818, and attribute video data 2816. The occupancy video data 2814 includes 2-D frame data. The attribute video data 2816 includes a set of two 2-D frames. e.g., the near and far layers. The geometry video data 2818 also includes a set of two 2-D frames, e.g., the near and far layers.

The patch data group unit type includes a plurality of data sets. For example, the patch data group unit types 2812 includes a sequence parameter set 2820, a frame geometry parameter set 2822, geometry patch parameter set 2826, a frame parameter set 2826, a frame attribute parameter set, and an attribute patch parameter set 2830. Additionally, the patch data group unit types 2812 includes a plurality of patch tile groups 2832. As previously mentioned, a patch tile group includes a plurality of patches. For example, a patch data group includes one set of patch tile group of T(i,0) to T(i,m). The information required to reconstruct a point cloud frame from the occupancy, attribute, and geometry components of the V-PCC Unit payload. "I" is a patch data group index that corresponds to the 3-D PCC frame "I." M+1 is the number of 3-D patches generated for the 3-D point cloud frame "I"; T(i,j) is referred to in this document as a patch.

Figure 29:
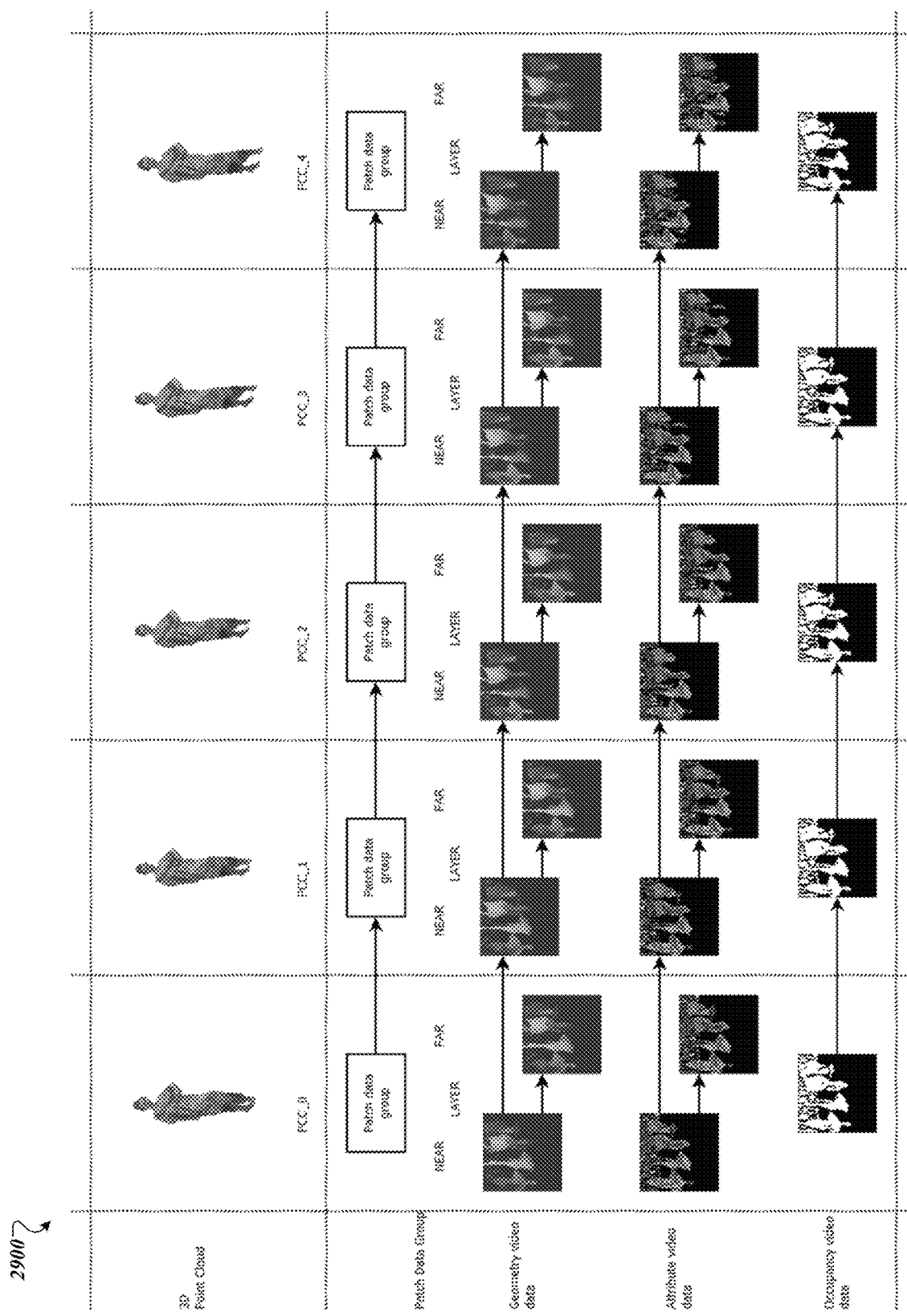
FIG. 29 is another example of a visual representation of a V-PCC unit payload.

FIG. 29 is another example of a visual representation 2900 of a V-PCC unit payload. As illustrated in the visual representation 2900 of the V-PCC unit payload, the arrows represent prediction flow from reference frame/data unit to a current data unit. The prediction between a near layer and a far layer is allowed only within the same V-PCC frame of data. For example, the visual representation 2900 illustrates a 3-D point cloud, a patch data group, geometry video data of near and far layers, attribute video data of near and far layers, and occupancy video data. d FIG. 30 is a flow diagram that illustrates an example of a process 3000 for performing motion estimation using 3D auxiliary data. The process 3000 may be performed by the V-PCC encoder or the V-PCC decoder, including the components shown in FIG. 27.

The V-PCC encoder generates a segmentation of three-dimensional point cloud data of recorded media based on continuity data of the three-dimensional point cloud data (3002). The V-PCC encoder segments the three-dimensional (3-D) point cloud data into a set of 3-D patch bounding boxes or segmentations, such as the 3-D patch bounding box 1504. Multiple segmentations may be generated for the entirety of the 3-D point cloud data to cover the object within the frame of the 3-D point cloud data. Each segmentation or 3-D patch bounding box may be placed in proximity to one another, or overlap one another when covering the object with the 3-D point cloud data.

The V-PCC encoder projects a representation of the segmented three-dimensional point cloud data onto one or more sides of a three-dimensional bounding box, the representation of the segmented three-dimensional point cloud data being different based on a projected side of the three-dimensional bounding box (3004). The V-PCC surrounds the 3-D point cloud data with a 3-D bounding box for projecting images of the 3-D point cloud data onto each side of the 3-D bounding box, such as the result shown in FIG. 16. In some implementations, the V-PCC encoder defines criteria for selecting a projection plane onto a side of the 3-D bounding box. For example, the criterion can include a smooth continuous surface criteria. Thus, a particular projection plane is chosen when the smooth continuous surface criterion includes a projected area of a segmentation on a side of the bounding box to be a maximum area among each of the directions of projection. A smooth continuous surface can be determined by the use of one or more smooth continuous algorithms. A smooth continuous surface can be defined as a surface that has a minimum amount of obscured or blocked data points. Then, the V-PCC encoder compares each of the smooth surfaces from each and every direction to determine which direction would generate a projection that would include a maximum area on a side of the 3-D bounding box. Once a particular projection plane is chosen, the V-PCC encoder projects the particular surface of the 3-D point cloud data onto the particular projection plane of the 3-D bounding box. In some implementations, the V-PCC encoder projects various surfaces of the 3-D point cloud data onto each side of the 3-D bounding box.

The V-PCC encoder generates one or more patches based on the projected representation of the segmented three-dimensional point cloud data (3006). Once the images have been projected on to the sides of the 3-D bounding box, the V-PCC encoder generates patches from each of the projections. Each patch, corresponding to the 2-D bounding box on the side of the 3-D bounding box, includes a set of coordinates. The patch corresponds to the area of the projection on the side of the 3-D bounding box. The coordinates for the patch includes a patch index, u0, v0, size_u0, and size_v0, for example. The patch index identifies a particular patch associated with a particular side of the corresponding bounding box. U0 defines an X-coordinate of the patch on a projection plane. V0 defines a Y-coordinate of the patch on a projection plane. Size_u0 and size_v0 describe a magnitude corresponding to each coordinate of the patch u0 and v0, respectively.

In some implementations, the V-PCC encoder combines the patches from each of the sides of the 3-D bounding box, and their corresponding coordinate information to form a "patch tile group." Each element of the patch tile group corresponds to a particular patch, which includes a specific and unique index and corresponds to a unique 3-D bounding box within the 3-D point cloud frame. For example, the packaged patch 1802 includes groups of patch tile groups, known as patch data groups.

The coordinate information from each patch in the patch data group is included in a projection map. The projection map is an additional file that is later provided by the V-PCC encoder to the video encoding solutions. The projection map includes 2-D and 3-D locational information for each patch. The 2-D data for a particular patch, e.g., u0, v0, which corresponds to the top left corner of the X and Y coordinates of the projection. Size_u0 and size_v0 correspond to the height and width of the corresponding patch. For the 3-D patch projection data, the projection map includes u1, v1, and d1 coordinates, which correspond to X, Y, and Z-axes. In particular, the u1, v1, and d1 correspond to the index of the face of the projection, or the face of the projection corresponding to the normal axis The V-PCC encoder generates a first frame of the one or more patches (3008). The V-PCC encoder generates a frame of the patch data group generated from 3006. The frame can be encoded and provided to the video compression solution for transmission.

The V-PCC encoder generates first auxiliary information for the first frame (3010). The first auxiliary information corresponds to patch metadata for a particular patch in the first frame. For example, the first auxiliary information can include a patch index, u0, v0, u1, v1, and d1 for a particular patch.

The V-PCC encoder generates second auxiliary information for a reference frame (3012). The V-PCC encoder retrieves a reference frame, which is a previously encoded frame that includes one or more patches. The V-PCC encoder retrieves a patch from the reference frame after decoding the reference frame, and retrieves the auxiliary information associated with the patch from the reference frame. The auxiliary information associated with the patch from the reference frame includes a patch index, u0, v0, u1, v1, and d1 for a particular patch.

The V-PCC encoder identifies a first patch from the first frame that matches a second patch from the reference frame based on the first auxiliary information and the second auxiliary information (3014). The V-PCC compares the auxiliary information associated with the first frame to the auxiliary information associated with the patch from the reference. For example, the V-PCC compares the patch index, the u0, the v0, the v1, and the d1 associated with each patch to determine a distance between this information. The V-PCC encoder compares the patch from the first frame with each patch from a reference frame to find a matching patch that has the minimum auxiliary information distance. Once the distance is at a minimum, the V-PCC encoder denotes the matching patches between the two patches.

The V-PCC encoder generates a motion vector candidate between the first patch and the second patch based on a difference between the first auxiliary information and the second auxiliary information (3016). A motion vector candidate is generated between the first patch and the second patch when the difference between their corresponding auxiliary information is at a minimum, compared to the other patches. The motion vector candidate is added to a list of motion vector candidates, which is used for transmission. The difference may be based on an estimate cost in rate distortion optimization. The cost or distance, e.g., a metric distance in metric or vector space, that is retuned by the estimate cost in rate distortion optimization function corresponds to a minimum amount of cost from the motion vector candidate list. When the minimum cost or distance is found, then the pcMvFieldNeighbors variable is updated with the X coordinate, Y coordinate, and minimized cost value that corresponds to the correct patch associated with the patch from the reference frame.

The V-PCC encoder performs motion compensation using the motion vector candidate (3018). Then, the V-PCC encoder performs motion compensations based on refined motion vector candidates and merge candidates. In some implementations, a new entity is generated from the list of merge candidates. This entity is used as a predictor to perform the motion estimation to find a better prediction for the motion estimation. For example, the motion vector candidate list is updated based on the 3-D information for the patches and corresponding 2-D patch location in the projected image. Additionally, the merge candidate list can be updated based on 3-D information for patches and corresponding 2-D location in the projected image. Thus, this information is added to the video compression and decompression. This information is created for the video encoder based on the auxiliary information and the same information is created for the video decoder. The motion vector candidate list is not transferred or calculated, but rather, generated by the V-PCC encoder upon receiving the 2-D patches with the patch metadata. The motion vector candidate list is generated according to the "Supplemental Information Generation for Video Coding" code set. Then, the new motion vector candidate and the merge candidate list are provided to existing video encoding/decoding techniques.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10 percentage of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks, and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features, that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   generating, by one or more processors, a segmentation of three-dimensional point cloud data of recorded media based on continuity data of the three-dimensional point cloud data;
   projecting, by the one or more processors, a representation of the segmented three-dimensional point cloud data onto one or more sides of a three-dimensional bounding box, the representation of the segmented three-dimensional point cloud data being different based on a projected side of the three-dimensional bounding box;
   in response to projecting the representation of the segmented three-dimensional point cloud data onto the one or more sides of the three-dimensional bounding box, generating, by the one or more processors, one or more patches based on the projected representation of the segmented three-dimensional point cloud data;
   generating, by the one or more processors, a first frame of the one or more patches;
   generating, by the one or more processors, first auxiliary information for the first frame;
   generating, by the one or more processors, second auxiliary information for a reference frame, wherein the reference frame includes one or more second patches and the reference frame is a previously encoded and transmitted frame;
   identifying, by the one or more processors, a first patch from the first frame that matches a second patch from the one or more second patches of the reference frame based on the first auxiliary information and the second auxiliary information;
   generating, by the one or more processors, a motion vector candidate between the first patch and the second patch based on a difference between the first auxiliary information and the second auxiliary information; and
   performing, by the one or more processors, motion compensation using the motion vector candidate.

2. The computer-implemented method of claim 1, wherein the reference frame is decoded to generate the second auxiliary information.

3. The computer-implemented method of claim 1, wherein generating the segmentation of the three-dimensional point cloud data of the recorded media further comprises:
   generating, by the one or more processors, a plurality of segmentations over the three-dimensional point cloud media for subsequently projecting and encoding each segmentation of the plurality of segmentations.

4. The computer-implemented method of claim 1, wherein the first auxiliary information includes index data for each of the one or more patches, two-dimensional data for each of the one or more patches, and three-dimensional data for each of the one or more patches.

5. The computer-implemented method of claim 4, wherein the index data for each of the one or more patches corresponds to a corresponding side of the three-dimensional bounding box.

6. The computer-implemented method of claim 4, wherein the two-dimensional data for each of the one or more patches and the three-dimensional data for each of the one or more patches correspond to a portion of the three-dimensional point cloud data are connected.

7. The computer-implemented method of claim 1, wherein generating the one or more patches for the three-dimensional point cloud data based on the continuity data of the three-dimensional point cloud data further comprises:
   determining, by the one or more processors, a smoothness criteria of the three-dimensional point cloud data from each direction;
   comparing, by the one or more processors, the smoothness criteria from each direction of the three-dimensional point cloud data; and
   in response to comparing, selecting, by the one or more processors, a direction of a smoothness criteria of three-dimensional point cloud data that has a greater projection area onto a side of a bounding box.

8. The computer-implemented method of claim 1, wherein generating the motion vector candidate between the first patch and the second patch further comprises:

determining, by the one or more processors, a distance between two-dimensional data of the first auxiliary information and two dimensional data of the second auxiliary information;

generating, by the one or more processors, the motion vector candidate based on the distance between the two-dimensional data of the first auxiliary information and the two dimensional data of the second auxiliary information; and adding, by the one or more processors, the motion vector candidate to a motion vector candidate list.

9. The computer-implemented method of claim 1, wherein the first auxiliary information for the first frame corresponds to patch metadata for a particular patch in the first frame.

10. A system comprising one or more computers and one or more storage devices storing instructions that are operable, when executed by the one or more computers, to cause the one or more computers to perform operations comprising:

generating a segmentation of three-dimensional point cloud data of recorded media based on continuity data of the three-dimensional point cloud data;

projecting a representation of the segmented three-dimensional point cloud data onto one or more sides of a three-dimensional bounding box, the representation of the segmented three-dimensional point cloud data being different based on a projected side of the three-dimensional bounding box;

in response to projecting the representation of the segmented three-dimensional point cloud data onto the one or more sides of the three-dimensional bounding box, generating one or more patches based on the projected representation of the segmented three-dimensional point cloud data;

generating a first frame of the one or more patches;

generating first auxiliary information for the first frame;

generating second auxiliary information for a reference frame, wherein the reference frame includes one or more second patches and the reference frame is a previously encoded and transmitted frame;

identifying a first patch from the first frame that matches a second patch from the one or more second patches of the reference frame based on the first auxiliary information and the second auxiliary information;

generating a motion vector candidate between the first patch and the second patch based on a difference between the first auxiliary information and the second auxiliary information; and performing motion compensation using the motion vector candidate.

11. The system of claim 10, wherein the reference frame is decoded to generate the second auxiliary information.

12. The system of claim 10, wherein generating the segmentation of the three-dimensional point cloud data of the recorded media further comprises:

generating a plurality of segmentations over the three-dimensional point cloud media for subsequently projecting and encoding each segmentation of the plurality of segmentations.

13. The system of claim 10, wherein the first auxiliary information includes index data for each of the one or more patches, two-dimensional data for each of the one or more patches, and three-dimensional data for each of the one or more patches.

14. The system of claim 13, wherein the index data for each of the one or more patches corresponds to a corresponding side of the three-dimensional bounding box.

15. The system of claim 13, wherein the two-dimensional data for each of the one or more patches and the three-dimensional data for each of the one or more patches correspond to a portion of the three-dimensional point cloud data are connected.

16. The system of claim 10, wherein generating the one or more patches for the three-dimensional point cloud data based on the continuity data of the three-dimensional point cloud data further comprises:

determining a smoothness criteria of the three-dimensional point cloud data from each direction;

comparing the smoothness criteria from each direction of the three-dimensional point cloud data; and in response to comparing, selecting a direction of a smoothness criteria of three-dimensional point cloud data that has a greater projection area onto a side of a bounding box.

17. The system of claim 10, wherein generating the motion vector candidate between the first patch and the second patch further comprises:

determining a distance between two-dimensional data of the first auxiliary information and two dimensional data of the second auxiliary information;

generating the motion vector candidate based on the distance between the two-dimensional data of the first auxiliary information and the two dimensional data of the second auxiliary information; and adding the motion vector candidate to a motion vector candidate list.

18. One or more non-transitory computer-readable storage media comprising instructions stored thereon that are executable by one or more processing devices and upon such execution cause the one or more processing devices to perform operations comprising:

generating a segmentation of three-dimensional point cloud data of recorded media based on continuity data of the three-dimensional point cloud data;

projecting a representation of the segmented three-dimensional point cloud data onto one or more sides of a three-dimensional bounding box, the representation of the segmented three-dimensional point cloud data being different based on a projected side of the three-dimensional bounding box;

in response to projecting the representation of the segmented three-dimensional point cloud data onto the one or more sides of the three-dimensional bounding box, generating one or more patches based on the projected representation of the segmented three-dimensional point cloud data;

generating a first frame of the one or more patches;

generating first auxiliary information for the first frame;

generating second auxiliary information for a reference frame, wherein the reference frame includes one or more second patches and the reference frame is a previously encoded and transmitted frame;

identifying a first patch from the first frame that matches a second patch from the one or more second patches of the reference frame based on the first auxiliary information and the second auxiliary information;

generating a motion vector candidate between the first patch and the second patch based on a difference between the first auxiliary information and the second auxiliary information; and performing motion compensation using the motion vector candidate.

19. The one or more non-transitory computer-readable media of claim 18, wherein the reference frame is decoded to generate the second auxiliary information.

20. The one or more non-transitory computer-readable media of claim 18, wherein generating the segmentation of the three-dimensional point cloud data of the recorded media further comprises:
  generating a plurality of segmentations over the three-dimensional point cloud media for subsequently projecting and encoding each segmentation of the plurality of segmentations.

* * * * *